(12) United States Patent
Krenn

(10) Patent No.: US 10,255,741 B2
(45) Date of Patent: *Apr. 9, 2019

(54) CHIP SORTING DEVICES AND RELATED ASSEMBLIES, COMPONENTS AND METHODS

(71) Applicant: Shuffle Master GmbH & Co KG, Vienna (AT)

(72) Inventor: Peter Krenn, Neufeld (AT)

(73) Assignee: Shuffle Master GmbH & Co KG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,585

(22) Filed: Nov. 27, 2017

(65) Prior Publication Data
US 2018/0075684 A1    Mar. 15, 2018

Related U.S. Application Data

(63) Continuation of application No. 15/092,427, filed on Apr. 6, 2016, now Pat. No. 9,836,909.

(51) Int. Cl.
*G07D 1/00*    (2006.01)
*G07D 3/14*    (2006.01)
(Continued)

(52) U.S. Cl.
CPC .............. *G07D 3/14* (2013.01); *B65G 47/46* (2013.01); *B65G 47/88* (2013.01); *G07D 3/02* (2013.01);
(Continued)

(58) Field of Classification Search
CPC .. G07D 1/00; G07D 1/02; G07D 1/04; G07D 1/06; G07D 1/08; G07D 3/00; G07D 3/02;
(Continued)

(56) References Cited

U.S. PATENT DOCUMENTS 1,200,843 A    10/1916    Baur
1,241,632 A    10/1917    Johnson
(Continued)

FOREIGN PATENT DOCUMENTS

AT    006405 U1    10/2003
AT    006546 U1    12/2003
(Continued)

OTHER PUBLICATIONS

Chipmaster Training handouts from Jan. 1994 (author unknown), 65 pages.
(Continued)

*Primary Examiner* — Jeffrey A Shapiro
(74) *Attorney, Agent, or Firm* — TraskBritt

(57) ABSTRACT

Chip sorting devices may include at least one chip collection tube having at least one adjustable wall that at least partially defines an inner diameter of the at least one chip collection tube. The at least one adjustable wall may be at least partially rotatable to define different inner diameters. Chip sorting devices may include a chip hopper having a relief mechanism for clearing chips that become jammed between a chip chamber and a base plate of the chip hopper. Methods of sorting chips may include actuating the relief mechanism to increase a space between a top plate of the relief mechanism and the chip chamber. Methods of setting up a chip sorting device may include adjusting an inner lateral dimension of the at least one chip collection tube.

19 Claims, 14 Drawing Sheets

(51) Int. Cl.
    *B65G 47/46* (2006.01)
    *B65G 47/88* (2006.01)
    *G07D 3/06* (2006.01)
    *G07D 3/12* (2006.01)
    *G07D 3/16* (2006.01)
    *G07D 9/00* (2006.01)
    *G07D 3/02* (2006.01)

(52) U.S. Cl.
    CPC .............. *G07D 3/06* (2013.01); *G07D 3/128* (2013.01); *G07D 3/16* (2013.01); *G07D 9/008* (2013.01)

(58) Field of Classification Search
    CPC  G07D 3/06; G07D 3/08; G07D 3/128; G07D 9/002; G07D 9/06; G07D 2201/00; G07D 13/00; G07F 3/04; G07F 5/24; G07F 9/08; G07F 19/203; B65G 47/46; B65G 47/88
    USPC ....... 221/113, 120, 239, 241, 242, 265, 294; 453/6, 7, 10–14, 21–26, 33–35, 41, 43, 453/44, 48, 49, 50–54, 57
    See application file for complete search history.

(56) References Cited

U.S. PATENT DOCUMENTS

| | | |
|---|---|---|
| 1,813,296 A | 7/1931 | Kidwell |
| 1,947,456 A | 2/1934 | Bock |
| 2,020,293 A | 11/1935 | Adelstein |
| 2,073,789 A | 3/1937 | Gee |
| 2,163,351 A | 6/1939 | Paul |
| 2,231,093 A | 2/1941 | Seemel |
| 2,904,151 A | 9/1959 | Johnson |
| 3,143,118 A | 8/1964 | Haines |
| 3,371,761 A | 3/1968 | Ryo |
| 3,387,616 A | 6/1968 | Bortz et al. |
| 3,435,833 A | 4/1969 | Tanaka |
| 3,463,171 A | 8/1969 | Dolman |
| 3,497,047 A | 2/1970 | Mobley |
| 3,583,410 A | 6/1971 | Bayha et al. |
| 3,625,230 A | 12/1971 | Zschaeck et al. |
| 3,680,566 A | 8/1972 | Tanaka et al. |
| 3,766,452 A | 10/1973 | Burpee et al. |
| 3,771,538 A | 11/1973 | Reis |
| 3,827,582 A | 8/1974 | Lederer |
| 3,902,511 A | 9/1975 | Jacobs |
| 4,010,766 A | 3/1977 | Bowles et al. |
| 4,060,093 A | 11/1977 | Douno |
| 4,098,056 A | 7/1978 | Ozaki |
| 4,102,110 A * | 7/1978 | Iizuka .................... G07D 9/065 453/61 |
| 4,157,139 A | 6/1979 | Bjork |
| 4,161,381 A | 7/1979 | Sciortino |
| 4,164,232 A | 8/1979 | Nakai et al. |
| 4,209,960 A | 7/1980 | Deutschlander et al. |
| 4,275,751 A | 6/1981 | Bergman |
| 4,360,034 A | 11/1982 | Davila et al. |
| 4,427,389 A | 1/1984 | D'Andrade |
| 4,531,531 A | 7/1985 | Johnson et al. |
| 4,543,969 A | 10/1985 | Rasmussen |
| 4,607,649 A | 8/1986 | Taipale et al. |
| 4,681,128 A | 7/1987 | Ristvedt et al. |
| 4,731,043 A | 3/1988 | Ristvedt et al. |
| 4,775,354 A | 10/1988 | Rasmussen et al. |
| 4,863,414 A | 9/1989 | Ristvedt et al. |
| 4,902,263 A | 2/1990 | Ito et al. |
| 4,966,570 A | 10/1990 | Ristvedt et al. |
| 5,011,455 A | 4/1991 | Rasmussen |
| 5,011,456 A | 4/1991 | Kobayashi et al. |
| 5,022,889 A | 6/1991 | Ristvedt et al. |
| 5,042,810 A | 8/1991 | Williams |
| 5,074,434 A | 12/1991 | Maki |
| 5,141,443 A | 8/1992 | Rasmussen et al. |
| 5,166,502 A | 11/1992 | Rendleman et al. |
| 5,207,612 A | 5/1993 | Wollaston |
| 5,277,651 A | 1/1994 | Rasmussen et al. |
| 5,406,264 A | 4/1995 | Plonsky et al. |
| 5,460,295 A | 10/1995 | Law |
| 5,472,074 A | 12/1995 | Milcetic |
| 5,531,331 A | 7/1996 | Barnett |
| 5,538,468 A | 7/1996 | Ristvedt et al. |
| 5,551,542 A | 9/1996 | Stockli |
| 5,607,352 A | 3/1997 | Tani |
| 5,624,308 A | 4/1997 | Rumbach |
| 5,651,548 A | 7/1997 | French et al. |
| 5,735,742 A | 4/1998 | French |
| 5,755,618 A | 5/1998 | Mothwurf |
| 5,757,876 A | 5/1998 | Dam et al. |
| 5,770,533 A | 6/1998 | Franchi |
| 5,781,647 A | 7/1998 | Fishbine et al. |
| 5,827,117 A | 10/1998 | Naas |
| 5,836,583 A | 11/1998 | Towers |
| 5,865,673 A | 2/1999 | Geib et al. |
| 5,895,321 A | 4/1999 | Gassies et al. |
| 5,931,732 A | 8/1999 | Abe et al. |
| 5,933,244 A | 8/1999 | Kiritchenko |
| 5,947,257 A | 9/1999 | Schwartz |
| 5,950,796 A | 9/1999 | Kobayashi |
| 5,957,262 A | 9/1999 | Molbak et al. |
| 5,957,776 A | 9/1999 | Hochne |
| 6,021,949 A | 2/2000 | Boiron |
| 6,030,284 A | 2/2000 | Frank |
| 6,075,217 A | 6/2000 | Kiritchenko |
| 6,080,056 A | 6/2000 | Karlsson |
| 6,099,402 A * | 8/2000 | Abe .................... G07D 9/008 221/241 |
| 6,139,418 A | 10/2000 | Geib et al. |
| 6,168,001 B1 | 1/2001 | Davis |
| 6,186,895 B1 | 2/2001 | Oliver |
| 6,193,599 B1 | 2/2001 | Kurosawa et al. |
| 6,260,757 B1 | 7/2001 | Strisower |
| 6,264,109 B1 | 7/2001 | Chapet et al. |
| 6,283,856 B1 | 9/2001 | Mothwurf |
| 6,296,190 B1 | 10/2001 | Rendleman |
| 6,313,871 B1 | 11/2001 | Schubert |
| 6,318,536 B1 * | 11/2001 | Korman .................. G06Q 20/18 194/217 |
| 6,381,294 B1 | 4/2002 | Britton |
| 6,425,817 B1 | 7/2002 | Momemy |
| 6,464,584 B2 | 10/2002 | Oliver |
| 6,506,115 B1 | 1/2003 | Mothwurf |
| 6,532,297 B1 | 3/2003 | Lindquist |
| 6,540,602 B2 | 4/2003 | Adams et al. |
| 6,567,159 B1 | 5/2003 | Corech |
| 6,572,474 B2 | 6/2003 | Rudd |
| 6,581,747 B1 | 6/2003 | Charlier et al. |
| 6,592,445 B2 | 7/2003 | Lee |
| 6,629,591 B1 | 10/2003 | Griswold et al. |
| 6,733,388 B2 | 5/2004 | Mothwurf |
| 6,753,830 B2 | 6/2004 | Gelbman |
| 6,772,870 B2 | 8/2004 | Sugai et al. |
| 6,776,702 B1 | 8/2004 | Ashford et al. |
| 6,976,589 B2 | 12/2005 | De Raedt et al. |
| 7,004,831 B2 | 2/2006 | Hino et al. |
| 7,014,554 B1 | 3/2006 | Fletcher et al. |
| 7,028,826 B2 | 4/2006 | De Raedt et al. |
| 7,066,335 B2 | 6/2006 | Aas et al. |
| 7,201,268 B2 | 4/2007 | DeMeutter et al. |
| 7,244,175 B2 | 7/2007 | Adams et al. |
| 7,681,708 B2 | 3/2010 | De Raedt et al. |
| 7,704,133 B2 | 4/2010 | Adams et al. |
| 7,861,868 B2 | 1/2011 | Blaha et al. |
| 7,926,638 B2 | 4/2011 | O'Byrne |
| 7,934,980 B2 | 5/2011 | Blaha et al. |
| 7,992,720 B2 | 8/2011 | Blaha et al. |
| 8,006,847 B2 | 8/2011 | Blaha et al. |
| 8,202,144 B2 | 6/2012 | Hino et al. |
| 8,298,052 B2 | 10/2012 | DeRaedt et al. |
| 8,336,699 B2 | 12/2012 | Blaha et al. |
| 8,393,942 B2 | 3/2013 | Blaha et al. |
| 8,678,164 B2 | 3/2014 | DeRaedt et al. |
| 8,757,349 B2 | 6/2014 | Blaha et al. |

(56) References Cited

U.S. PATENT DOCUMENTS

| | | | |
|---|---|---|---|
| 9,105,140 | B2 | 8/2015 | Enomoto |
| 2002/0061724 | A1 | 5/2002 | Nomura |
| 2002/0074209 | A1 | 6/2002 | Karlsson |
| 2003/0019716 | A1 | 1/2003 | Sugai et al. |
| 2003/0111395 | A1 | 6/2003 | Aas et al. |
| 2004/0149539 | A1 | 8/2004 | De Raedt et al. |
| 2004/0238320 | A1 | 12/2004 | Hino et al. |
| 2005/0142998 | A1 | 6/2005 | Enomoto et al. |
| 2005/0155838 | A1 | 7/2005 | Raedt et al. |
| 2005/0176360 | A1* | 8/2005 | Abe .................. G07D 9/008 453/57 |
| 2005/0280212 | A1 | 12/2005 | Blaha et al. |
| 2006/0113161 | A1 | 6/2006 | Umeda |
| 2006/0281397 | A1 | 12/2006 | Sanchis Franch et al. |
| 2007/0099553 | A1 | 5/2007 | Blaha et al. |
| 2007/0212996 | A1 | 9/2007 | Ryou |
| 2009/0047899 | A1 | 2/2009 | Adams et al. |
| 2010/0230233 | A1 | 9/2010 | De Raedt et al. |
| 2011/0001290 | A9 | 1/2011 | Blaha et al. |
| 2011/0105002 | A1 | 5/2011 | Blaha et al. |
| 2011/0207390 | A1 | 8/2011 | Blaha et al. |
| 2011/0306284 | A1 | 12/2011 | Blaha et al. |
| 2013/0102236 | A1 | 4/2013 | Blaha et al. |
| 2013/0205723 | A1 | 8/2013 | Blake et al. |
| 2014/0170948 | A1 | 6/2014 | Enomoto |
| 2014/0194045 | A1 | 7/2014 | Fischer et al. |
| 2014/0202825 | A1 | 7/2014 | DeRaedt et al. |
| 2014/0302762 | A1 | 10/2014 | Blaha et al. |
| 2015/0140912 | A1 | 5/2015 | Chein et al. |
| 2015/0302678 | A1 | 10/2015 | Blake et al. |

FOREIGN PATENT DOCUMENTS

| | | |
|---|---|---|
| AT | 007854 U1 | 10/2005 |
| CA | 2090073 A1 | 8/1994 |
| CA | 2229054 A1 | 8/1996 |
| CA | 2229053 A1 | 10/1996 |
| DE | 3144327 A1 | 5/1983 |
| DE | 4240886 A1 | 7/1994 |
| EP | 615216 A2 | 9/1994 |
| EP | 0424355 B1 | 11/1994 |
| EP | 0631260 B1 | 12/1994 |
| EP | 0757582 B1 | 2/1997 |
| EP | 0806020 B1 | 12/1998 |
| EP | 1080348 B1 | 8/2002 |
| EP | 0823041 B1 | 9/2002 |
| EP | 0950989 B1 | 9/2003 |
| EP | 1050024 B1 | 3/2004 |
| EP | 2497068 | 5/2011 |
| EP | 2960875 A1 | 12/2015 |
| FR | 2749093 B1 | 7/1998 |
| FR | 2752078 A1 | 10/1998 |
| GB | 359036 A | 10/1931 |
| GB | 720707 A | 12/1954 |
| GB | 1255492 A | 12/1971 |
| GB | 1571219 A | 7/1980 |
| GB | 2061490 A | 5/1981 |
| GB | 2198274 A | 6/1988 |
| GB | 2203582 A | 10/1988 |
| GB | 2254419 A | 10/1992 |
| GB | 2333632 A | 7/1999 |
| IT | 1094A001040 A | 12/1994 |
| JP | 1999096426 A * | 4/1999 ............ G07D 1/00 |
| WO | 9117842 A1 | 11/1991 |
| WO | 9211953 A1 | 7/1992 |
| WO | 9528996 A1 | 11/1995 |
| WO | 9623281 A1 | 8/1996 |
| WO | 9634258 A1 | 10/1996 |
| WO | 9938126 A1 | 7/1999 |
| WO | 9960353 A1 | 11/1999 |
| WO | 03049045 A1 | 6/2003 |
| WO | 03103860 A1 | 12/2003 |
| WO | 2004009256 A1 | 1/2004 |
| WO | 2004069431 A2 | 8/2004 |
| WO | 2008046561 A1 | 4/2008 |
| WO | 2011051700 A1 | 5/2011 |

OTHER PUBLICATIONS

Cover sheet of 1993 video tape describing the Chipmaster (author unknown), 1 page.
Trial installation of Chipmaster at Holland Casinos, report by Christian Pohanka, Sep. 29, 1993, 5 pages.
Huxley's advertisement for Chipmaster: Huxley's count on the Chipmaster deal, ("Casino World" is distributed in the U.S.) Mar. 1994 (author unknown), 1 page.
International Search Report for International Application No. PCT/EP2017/057593, dated Oct. 4, 2017, 6 pages.
International Written Opinion for International Application No. PCT/EP2017/057593, dated Oct. 4, 2017, 12 pages.
Show report for Chipmaster in Monte Carlo by Christian Pohanka, Mar. 23, 1993, 4 pages.
International Partial Search Report and Provisional Opinion for International Application No. PCT/EP2017/057593, dated Jul. 10, 2017, 13 pages.
Photograph of first Chipmaster installation at Casino Baden (Austria), Jan. 4, 2004 (photographer unknown), 1 page.
Photograph of first Chipmaster installation at Holland Casinos, Jan. 4, 2004 (photographer unknown), 1 page.
Photographs of Chipmaster in Paulson Booth at Apr. 26-27, 1994 Show (photographer unknown), 4 pages.
Photograph of first Chipmaster installation at Valencia (Spain), Jan. 4, 2004 (photographer unknown), 1 page.
Photograph of Chipmaster production at VICOMA, Vienna, Jan. 4, 2005 (photographer unknown), 1 page.
Report from Spain regarding Chipmaster by Christina Pohanka, Sep. 26, 1993, 5 pages.
U.S. Appl. No. 15/092,427, filed Apr. 6, 2016, titled "Chip Sorting Devices and Related Assemblies, Components and Methods", to Krenn, 47 pages.
Visit report Casino Picayo—Valencia—Spain from Sep. 24, 1993, (author unknown), 2 pages.

* cited by examiner

CHIP SORTING DEVICES AND RELATED ASSEMBLIES, COMPONENTS AND METHODS

CROSS-REFERENCE TO RELATED APPLICATION

This application is a continuation of U.S. patent application Ser. No. 15/092,427, filed Apr. 6, 2016, now U.S. Pat. No. 9,836,909, issued Dec. 5, 2017, the disclosure of which is hereby incorporated herein in its entirety by this reference.

TECHNICAL FIELD

The disclosure relates to chip sorting devices and related assemblies, components and methods. In particular, embodiments of the disclosure relate to chip sorting devices, collecting tubes for chip sorting devices, chip jam clearing systems, and methods of sorting chips.

BACKGROUND

Given the desire to improve profitability and increase the speed and efficiency of table game play in gaming establishments, there is a need to reduce costs through cost savings and replacement costs due to wear and tear on equipment. Furthermore, given the desire to improve profitability and increase the speed and efficiency of game play in gaming establishments, there is a need to increase the number of rounds that may be played with gaming equipment in a selected amount of time, decrease the amount of work performed by human dealers, etc. For example, there is a need for improved chip sorting devices, which may have the same or similar profile as existing equipment to avoid retrofitting existing gaming tables and that include adjustable positioning structures to permit limited movement of the device adjacent the gaming table surface. Additionally, it may be desirable to develop improved chip sorting devices having reduced production cost, which may improve efficiency, improve reliability, reduce wear on chips and minimize noise to preserve the casino ambience. Furthermore, it may be desirable to develop improved chip sorting devices that are easily customizable to accommodate varying chip sizes. Finally, it may be desirable to develop improved chip sorting devices having jammed chip clearing features in order to improve reliability of the chip sorting devices.

BRIEF SUMMARY

This summary is provided to introduce a selection of exemplary embodiments in a simplified form. These exemplary embodiments are described in further detail in the detailed description below. This summary is not intended to identify key features or essential features of the claimed subject matter, nor is it intended to be used to limit the scope of the claimed subject matter.

Some embodiments of the present disclosure include a chip sorting device. The chip sorting device may include a chip conveyor unit having at least one chip well for transporting chips, at least one chip collection tube, and at least one chip ejection unit. The at least one chip collection tube may have an inner lateral dimension defined therein for receiving at least one chip therein. The at least one chip collection tube may include at least one frame assembly; and at least one adjustable wall coupled to the at least one frame assembly and at least partially defining the inner lateral dimension of the at least one chip collection tube. At least a portion of the at least one adjustable wall may be rotatable relative to the at least one frame assembly in order to selectively increase and decrease the inner lateral dimension of the at least one chip collection tube. The at least one chip ejection unit may be configured and positioned to eject at least one chip from the at least one chip well of the chip conveyor unit into the at least one chip collection tube.

Some embodiments of the present disclosure include a chip sorting device. The chip sorting device may include a chip hopper and a chip conveyor unit. The chip hopper may include a base plate, a chip chamber mounted over the base plate and rotatable about a center axis relative to the base plate, and a relief mechanism. The chip chamber may include a separating wheel base defining a plurality of circular holes configured to receive at least one chip therein. The relief mechanism may have a top plate having a top surface oriented at least substantially flush with an upper surface of the base plate. The relief mechanism may be configured to move away from the chip chamber. The chip conveyor unit may include at least one chip well configured to receive a chip therein from the chip hopper.

Some embodiments of the present disclosure include methods of sorting chips. The methods may include inserting at least one chip into a chip chamber of a chip hopper rotatably mounted over of a base plate of the chip hopper, receiving the at least one chip into a hole of a plurality of circular holes defined in a separating wheel base of the chip chamber, transporting the at least one chip along a circumferential path on an upper surface of the base plate of the chip hopper, and increasing space between the chip chamber and a top plate of a relief mechanism by moving the top plate of the relief mechanism away from the chip chamber and relative to the base plate of the chip hopper.

Some embodiments of the present disclosure include methods of setting up a chip sorting device. The methods may include adjusting an inner lateral dimension of at least one chip collection tube of the chip sorting device to accommodate at least one chip. Adjusting an inner lateral dimension of at least one chip collection tube to accommodate at least one chip may include rotating an adjustment mechanism of the at least one chip collection tube relative to a frame assembly of the at least one chip collection tube and rotating at least one adjustable wall into an interior of the frame assembly of the at least one chip collection tube, the at least one adjustable wall defining at least a portion of the inner lateral dimension of the at least one chip collection tube.

BRIEF DESCRIPTION OF THE DRAWINGS

The present disclosure may be understood more fully by reference to the following detailed description of example embodiments, which are illustrated in the accompanying figures.

DETAILED DESCRIPTION

Figure 1:
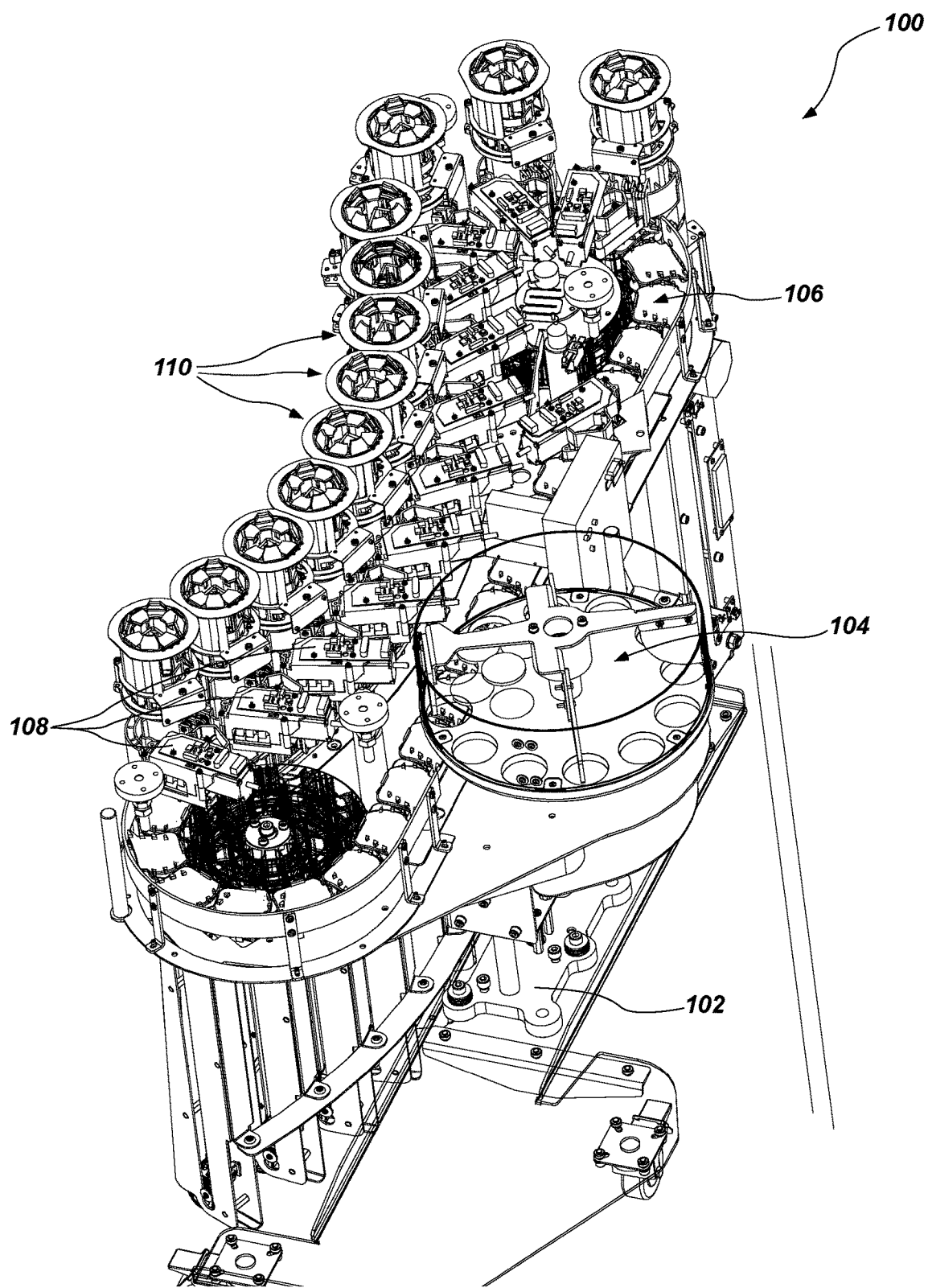
FIG. 1 shows a perspective view of a chip sorting device, according to an embodiment of the present disclosure, with portions of housings removed to show interior components of the chip sorting device.

The illustrations presented herein are not meant to be actual views of any particular chip sorting device, or component thereof, but are merely simplified schematic representations employed to describe illustrative embodiments of the disclosure. The drawings are not necessarily to scale.

Some embodiments of the present disclosure may include chip sorting devices having chip collection tubes having variable inner lateral dimensions or areas (e.g., diameters, cross-sectional areas, etc.). In other words, the inner diameters, or one or more components defining effective inner diameters, of the chip collection tubes may be adjusted to accommodate different sized chips. Some embodiments of the present disclosure may include sorting devices having chip collection tubes that have a plurality of adjustable walls that define the inner diameters, and the adjustable walls may be rotatable within the chip collection tubes to change the inner diameters of the chip collection tubes. Some embodiments of the present disclosure include chip sorting devices having chip hoppers, which may include relief mechanisms for clearing chips positioned (e.g., jammed) between various portions of the chip sorting device (e.g., between portions of a chip hopper. The relief mechanism may provide an increased space for the jammed chips to enable the jammed chips to be removed and delivered to a chip conveyor unit.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. For example, these terms may refer to an orientation of elements of the chip sorting device relative to a surface of a table beneath which the chip sorting device may be positioned and operated (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements of the chip sorting device relative to a surface of a table beneath which the chip sorting device may be positioned and operated.

A perspective view of a chip sorting device 100 with portions of one or more housings of the chip sorting device 100 removed to show interior components of the chip sorting device 100 is shown in FIG. 1. The chip sorting device 100 may be positioned beneath a table surface (e.g., a gaming table surface) of a table (e.g., a gaming table) and to deliver sorted chips to the table surface and/or receive chips to be sorted from the table surface. As shown, the chip sorting device 100 may comprise a frame structure 102, a chip hopper 104, a chip conveyor unit 106, a plurality of chip ejection units 108, and a plurality of chip collection tubes 110. The chip hopper 104 may be oriented at least partially over the chip conveyor unit 106 and any chips sorted by the chip hopper 104 may be moved (e.g., dropped) from the chip hopper 104 onto the chip conveyor unit 106. The plurality of chip ejection units 108 and the plurality of chip collection tubes 110 may be disposed adjacent to the chip conveyor unit 106 along a length of the chip conveyor unit 106.

Figure 2:
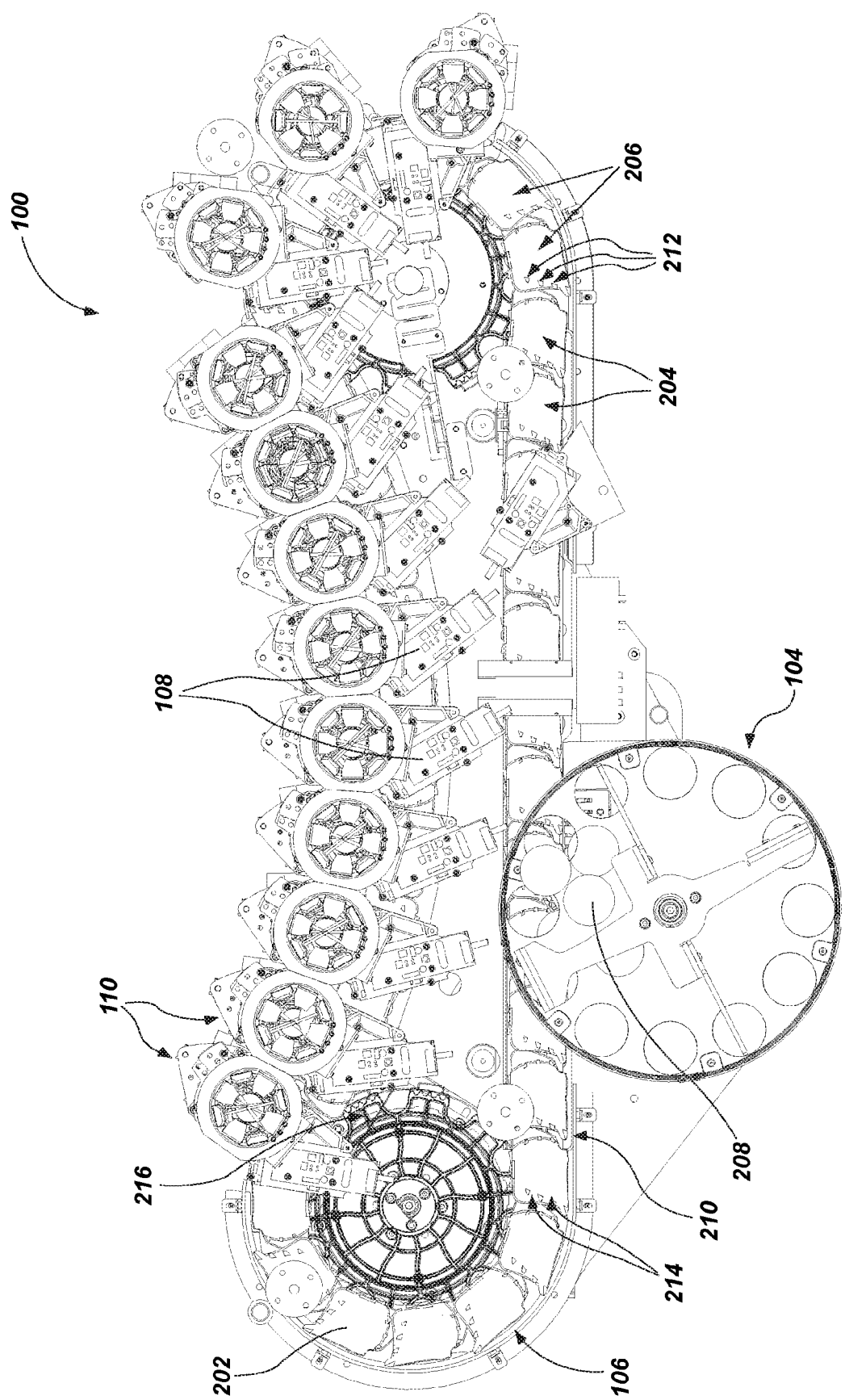
FIG. 2 shows a top elevation of the chip sorting device of FIG. 1 having additional portions of housings removed to show interior components of the chip sorting device.

FIG. 2 is a top elevation of the chip sorting device 100 with portions of housings removed to more clearly show interior components of the chip sorting device 100. The chip conveyor unit 106 may include an articulated conveyor 202, which may be arranged along a fixed path within the chip sorting device 100. The articulated conveyor 202 may comprise a plurality of articulated link units 204 and each link unit 204 may include a chip well 206 for carrying at least one chip 208. Each chip well 206 may be at least partially defined by and positioned adjacent to segmented guide walls 210 comprised of a plurality of wall segments 212, and a plurality of channels 214 may be defined between wall segments 212 of the plurality of wall segments 212.

The fixed path of the articulated conveyor 202 may enable each link unit 204, and any chips 208 that may be carried thereby, to travel along a generally straight path (i.e., a substantially linear path) when proximate to the chip hopper 104. The fixed path may enable each link unit 204, and any chips 208 that may be carried thereby, to travel along a generally curved path when proximate to the plurality of chip ejection units 108 and corresponding plurality of chip collection tubes 110. In some embodiments, a drive belt 216 of the chip conveyor unit 106 may be at least partially formed from a nonmetal material (e.g., not a metal chain drive belt). For example, the drive belt 216 may be formed from a flexible polymer material, internally fiber-reinforced as desirable, that may require little to no maintenance (e.g., may not require regularly scheduled lubrication).

In some embodiments, the chip sorting device 100 may include a lifting mechanism configured to lift chip sorting device 100 relative to a table to which the chip sorting device 100 may be positioned under. In some embodiments, the lifting mechanism may be operated pneumatically. In other embodiments, the lifting mechanism may be operated electrically.

Figure 3:
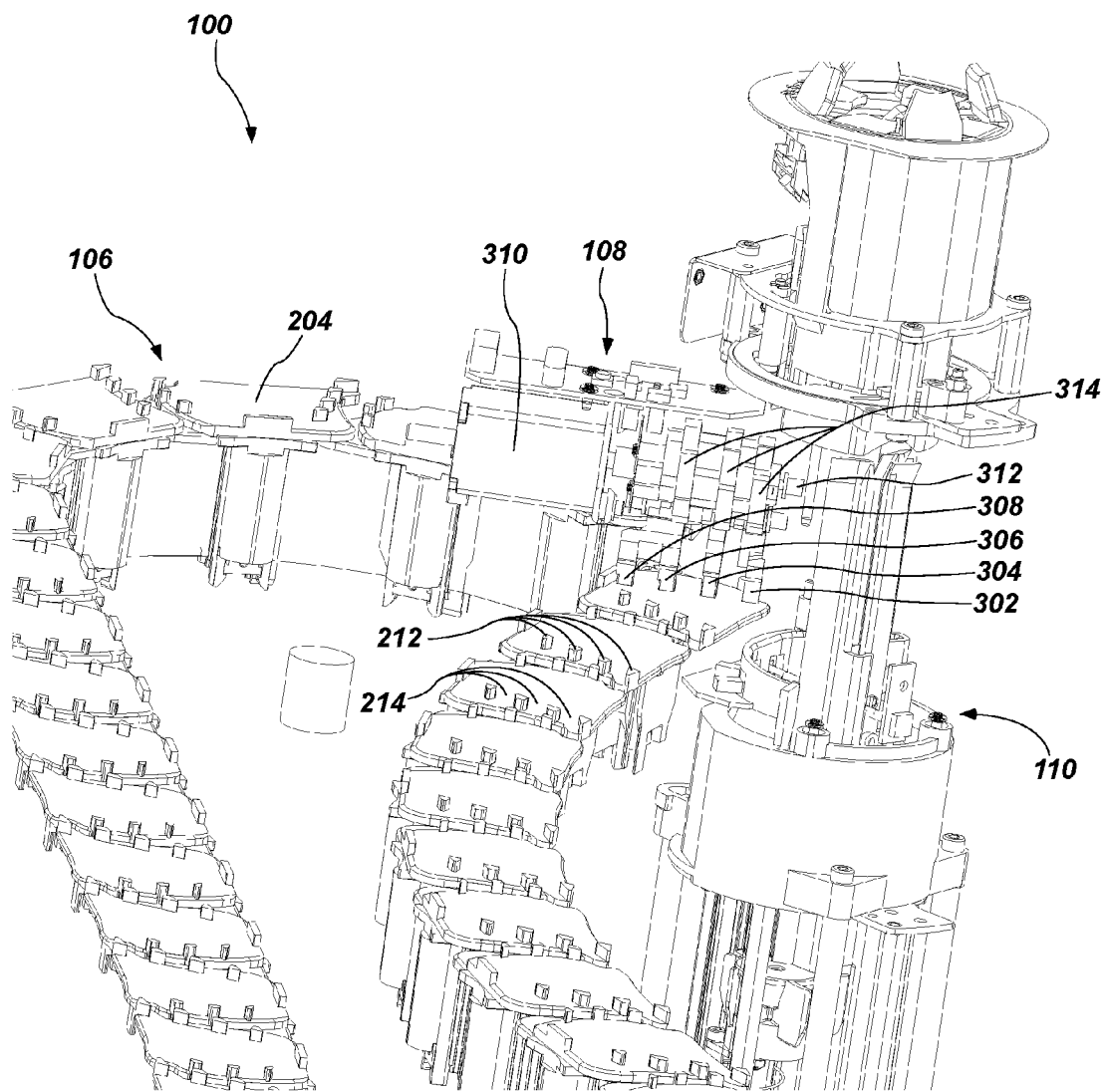
FIG. 3 shows a perspective view of a chip ejection unit of the chip sorting device of FIG. 1.

FIG. 3 is a perspective view of a chip ejection unit 108 of the plurality of chip ejection units 108 of a chip sorting device (e.g., the chip sorting device 100 shown in FIGS. 1 and 2). In some embodiments, the chip sorting device 100 may include chip ejections units as described in U.S. Pat. No. 8,336,699 to Blaha et al., the disclosure of which is incorporated in its entirety by this reference. For example, each chip ejection unit 108 may include finger members 302, 304, 306, 308 sized and positioned to be positioned adjacent and/or between one or more wall segments 212 of the plurality wall segments 212 and into the plurality of channels 214. In other words, the finger members 302, 304, 306, 308 of the chip ejection units 108 may be positioned axially over the plurality of channels 214 and may be selectively movable into the plurality of channels 214. The finger members 302, 304, 306, 308 may operate in the same manner as the finger members 302 of the chip ejection units described in U.S. Pat. No. 8,336,699 to Blaha et al. to eject selected chips 208 into selected chip collection tubes 110 according to different chip classifications. For example, each chip ejection unit 108 of the plurality of chip ejection units 108 may include a motor 310, such as one of a stepper motor and a servomotor, attached to a cam shaft 312 supporting a plurality of cams 314, such as tri-lobe cams, thereon. The cams 314 may be oriented to move each of the finger members 302, 304, 306, 308 from a first position to a second position, and back to the first position, in a sequence by rotation of the cam shaft 312 with the motor 310. For example, the cams 314 may be oriented to lower the finger members 302, 304, 306, 308 into alignment with the plurality of channels 214 to block a pathway of a chip 208 (FIG. 2) being transported in a chip well 206 (FIG. 2) of the chip conveyor unit 106 in order to move the chip 208 toward a respective chip collection tube 110.

Figure 4A:
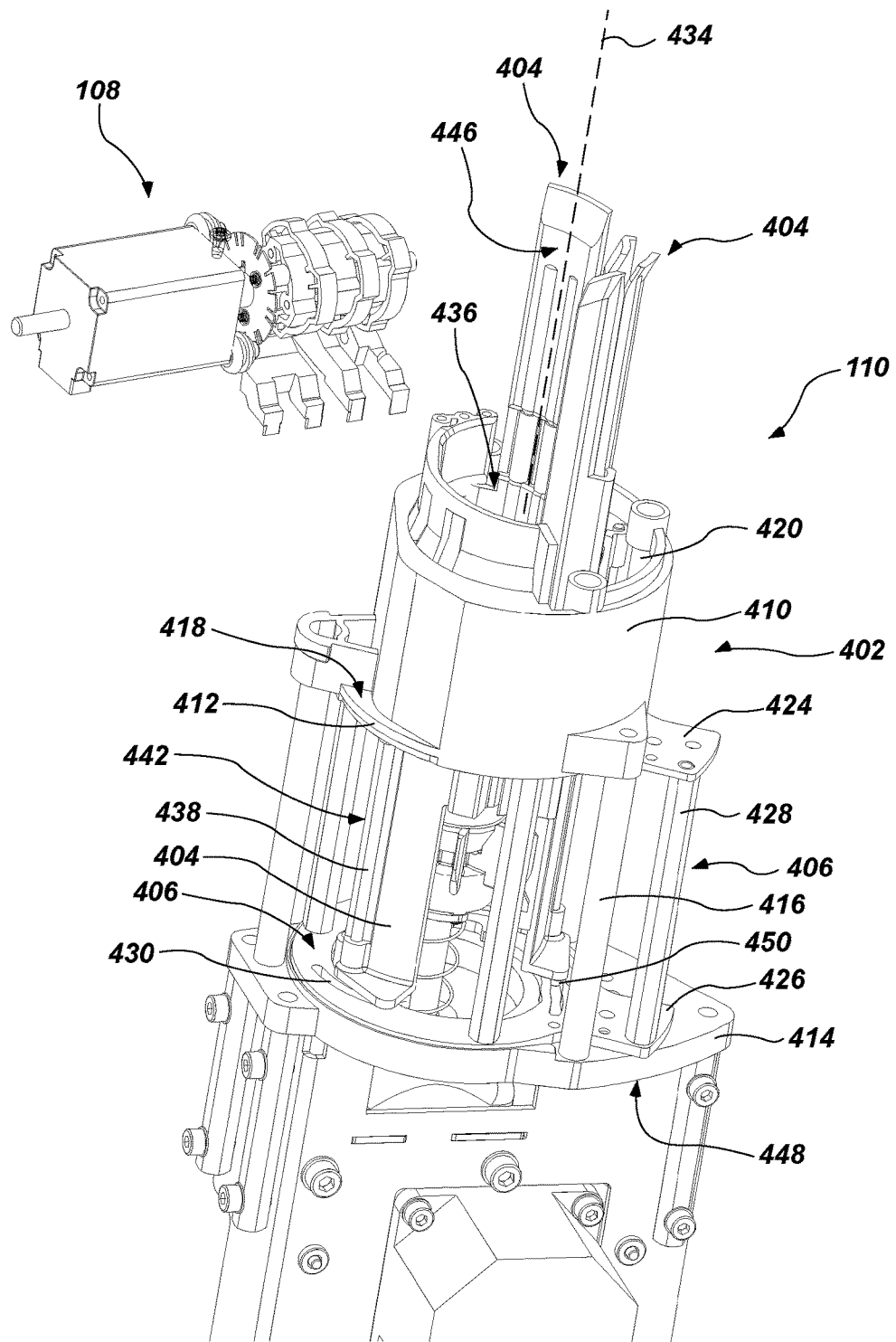
FIG. 4A shows a perspective view of a chip collection tube of the chip sorting device of FIG. 1 having portions removed to show a first plurality of adjustable walls within the chip collection tube.
Figure 4B:
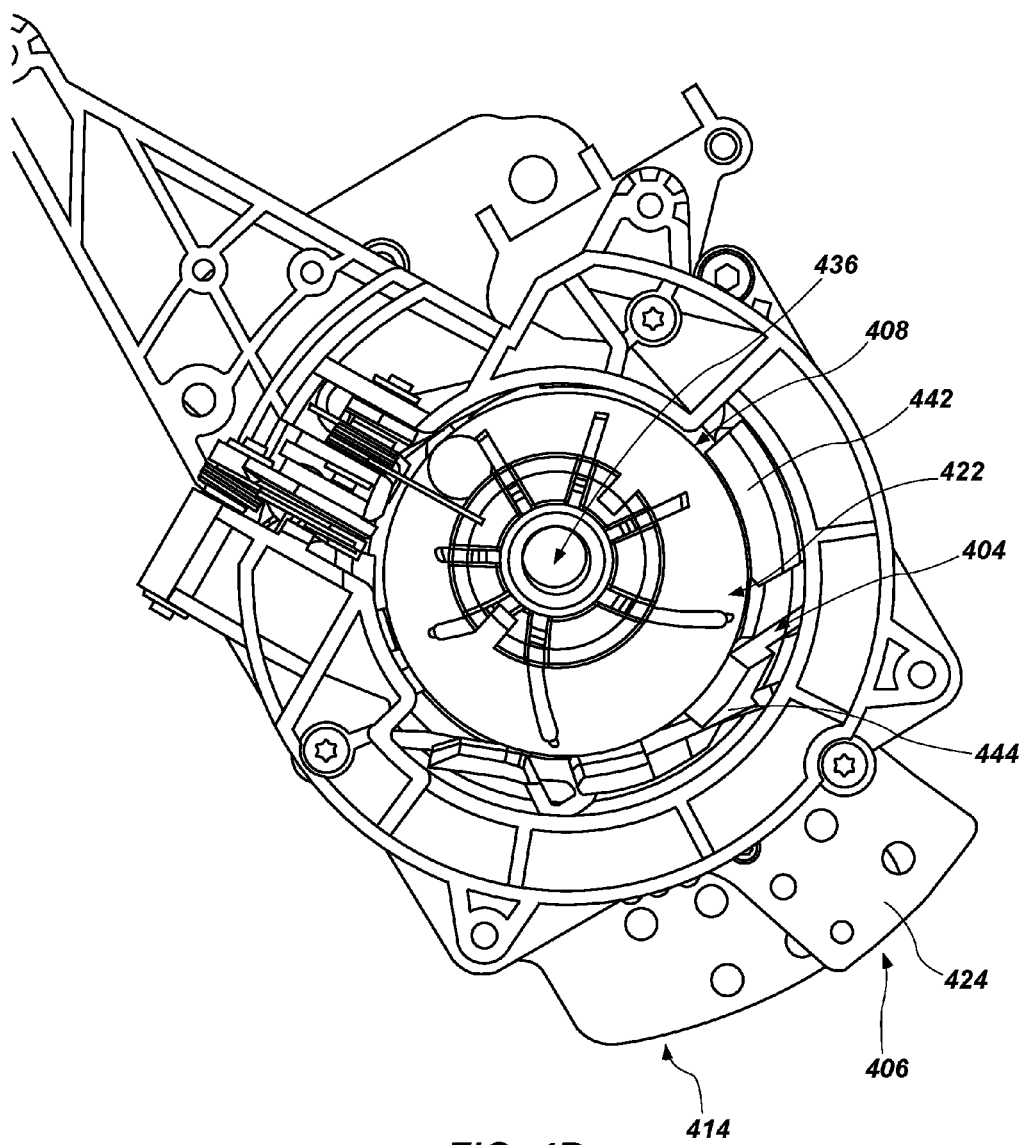
FIG. 4B shows a top elevation of the chip collection tube of FIG. 4A having portions removed to show the first plurality of adjustable walls within the chip collection tube.
Figure 4C:
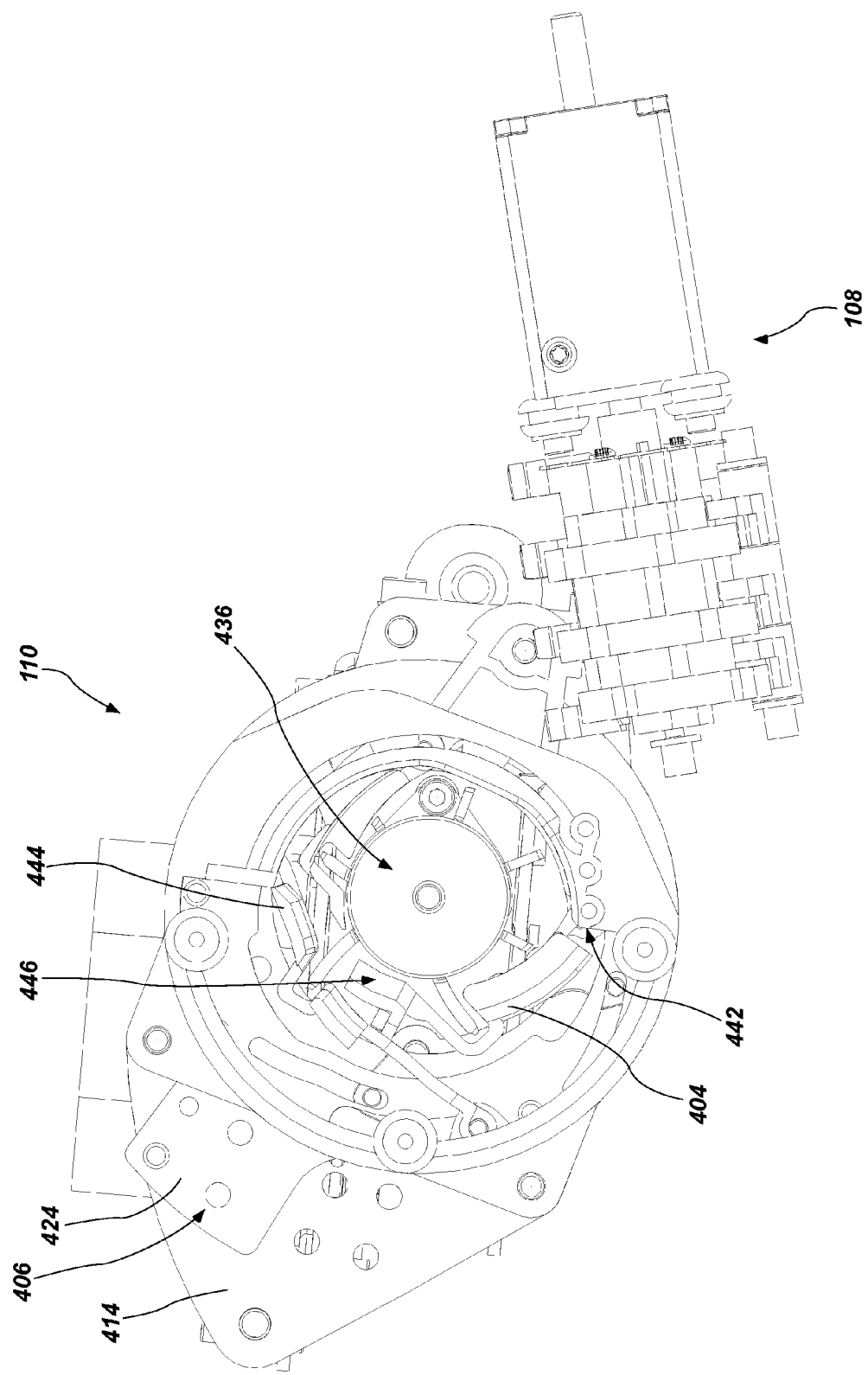
FIG. 4C shows another top elevation of the chip collection tube of FIG. 4A having portions removed to show the first plurality of adjustable walls within the chip collection tube.

FIG. 4A is a top perspective view of a chip collection tube 110 of the plurality of chip collection tubes 110 of the chip sorting device 100 (FIG. 1) with portions removed to more clearly show internal components thereof. FIG. 4B is a top elevation of the chip collection tube 110 of FIG. 4A with portions removed to more clearly show components thereof. FIG. 4C is a top elevation of the chip collection tube 110 of FIG. 4A with portions removed to more clearly show components thereof. Referring to FIGS. 4A-4C together, the chip collection tube 110 may include a first frame assembly 402, a first plurality of adjustable walls 404, a first adjustment mechanism 406, and an inner lateral dimension (e.g., an inner diameter 408) that is at least partially defined by the first plurality of adjustable walls 404. The first frame assembly 402 may include a first tubular portion 410 where a chip 208 may be received into the chip collection tube 110 from the chip conveyor unit 106 (FIG. 1). The first frame assembly 402 may further include an upper plate 412, a lower plate 414, and first plurality of support members 416.

The first tubular portion 410 may be mounted to an upper surface 418 of the upper plate 412 and may define an aperture 420 extending therethrough, which may extend in an at least substantially vertical direction. The upper plate 412 may be disposed above the lower plate 414 with the first plurality of support members 416 connected to and extending between the upper plate 412 and lower plate 414. The upper plate 412 may further have a hole 422, as shown in FIG. 4B, extending therethrough, which may be at least substantially aligned with the aperture 420 extending through the first tubular portion 410.

The first adjustment mechanism 406 may be disposed between the upper plate 412 and lower plate 414 of the first frame assembly 402. The first adjustment mechanism 406 may include an upper plate portion 424, a lower plate portion 426, and a second plurality of support members 428. The upper plate portion 424 of the first adjustment mechanism 406 may be disposed adjacent to a lower surface of the upper plate 412 of the first frame assembly 402. The lower plate portion 426 of the first adjustment mechanism 406 may be disposed adjacent to an upper surface of the lower plate 414 of the first frame assembly 402. In some embodiments, the lower plate portion 426 may include a first plurality of guide recesses 430 defined in an upper surface thereof. Each guide recess 430 of the first plurality of guide recesses 430 may define a respective pathway in the upper surface of the lower plate portion 426 of the first adjustment mechanism 406. In some embodiments, the upper plate portion 424 of the first adjustment mechanism 406 may also include guide recesses (not shown). The second plurality of support members 428 may be connected to and may extend between the upper plate portion 424 and lower plate portion 426. The first adjustment mechanism 406 may be rotatable relative to the first frame assembly 402 of the chip collection tube 110 and about a central longitudinal axis 434 of the chip collection tube 110.

The first plurality of adjustable walls 404 may be disposed within an interior 436 of the first frame assembly 402 and may extend from the lower plate portion 426 of the first adjustment mechanism 406, through the hole 422 in the upper plate 412, and into the aperture 420 of the first tubular portion 410 of the first frame assembly 402. In some embodiments, at least a portion of the first plurality of adjustable walls 404 may extend out of an upper longitudinal end of the first tubular portion 410 of the first frame assembly 402. In other words, portions of the first plurality of adjustable walls 404 may extend above the first tubular portion 410 of the first frame assembly 402.

Each adjustable wall 404 of the first plurality of adjustable walls 404 may include a pivot side 442 and a swing side 444. Each adjustable wall 404 may further include at least one inner surface 446. The at least one inner surface 446 of each adjustable wall 404 may face the interior 436 of the first frame assembly 402 of the chip collection tube 110 and may at least partially define the inner diameter 408 of chip collection tube 110, as shown in FIG. 4B.

The pivot side 442 of each adjustable wall 404 of the first plurality of adjustable walls 404 may be rotatably mounted to the lower plate 414 of the first frame assembly 402, and each adjustable wall 404 of the first plurality of adjustable walls 404 may be rotatable about an axis that is at least substantially parallel to the central longitudinal axis 434 of the chip collection tube 110. For example, the first frame assembly 402 may include a first plurality of rod members 438 extending from the lower plate 414 to the upper plate 412 thereof, and the pivot side 442 of each adjustable wall 404 of the first plurality of adjustable walls 404 may be rotatably coupled to a respective rod member 438 of the first plurality of rod members 438, and each adjustable wall 404 of the first plurality of adjustable walls 404 may be rotatable about a respective rod member 438. Consequently, a swing side 444 of each adjustable wall 404 may be rotatable into the interior 436 of the first frame assembly 402, as shown in FIG. 4C. As a result, the at least one inner surface 446 of each adjustable wall 404 of the first plurality of adjustable walls 404 may be movable at least generally radially toward the central longitudinal axis 434 of the chip collection tube 110, effectively changing the inner diameter 408 of the chip collection tube 110.

In some embodiments, the at least one inner surface 446 of each adjustable wall 404 of the first plurality of adjustable walls 404 may have an at least substantially curved shape. In other words, the at least one inner surface 446 of each adjustable wall 404 may have at least some curvature (e.g., may be concave). For example, a curvature of the at least one inner surface 446 of each adjustable wall 404 may at least substantially match a curvature of a maximum inner diameter 408 of the chip collection tube 110. In other embodiments, the curvature of the at least one inner surface 446 of each adjustable wall 404 may at least substantially match a curvature of a minimum inner diameter 408 of the chip collection tube 110. In other embodiments, the curvature of the at least one inner surface 446 of each adjustable wall 404 may at least substantially match a curvature of an intermediate inner diameter 408 of the chip collection tube 110.

Referring to FIG. 4A, each adjustable wall 404 of the first plurality of adjustable walls 404 may include a pin member 450 extending from a longitudinal end of each adjustable wall 404. The pin member 450 may extend into a respective guide recess 430 of the first plurality of guide recesses 430 defined in an upper surface of the lower plate portion 426 of the first adjustment mechanism 406 and may be movable along the pathway of the respective guide recess 430 of the first plurality of guide recesses 430. The pathway of each guide recess 430 of the first plurality of guide recesses 430 may cause a respective adjustable wall 404 to rotate about the pivot side 442 of the respective adjustable wall 404 as the pin member 450 moves along the pathway.

Referring to FIGS. 4A, 4B, and 4C together, in operation, when changing the inner diameter 408 of a chip collection tube 110 of the plurality of chip collection tubes 110, the first plurality of adjustable walls 404 may be rotated into or out of the interior 436 of first frame assembly 402 of the chip collection tube 110 by rotating the first adjustment mechanism 406 relative to the first frame assembly 402 and about the central longitudinal axis 434 of the chip collection tube 110. As the first adjustment mechanism 406 is rotated relative to the first frame assembly 402 each pin member 450 of each adjustable wall 404 of the first plurality of adjustable walls 404 may move along a respective pathway of a respective guide recess 430 of the first plurality of guide recesses 430. As each pin member 450 moves along a respective pathway of a respective guide recess 430 of the first plurality of guide recesses 430, the first plurality of adjustable walls 404 may rotate about the pivot sides 442 of the first plurality of adjustable walls 404. As a result, the swing sides 444 of the first plurality of adjustable walls 404 may be rotated into the interior 436 of the first frame assembly 402 of the chip collection tube 110 and toward the central longitudinal axis 434 of the chip collection tube 110. Also as a result, the at least one inner surface 446 of the first plurality of adjustable walls 404 may be moved toward the central longitudinal axis 434 of the chip collection tube 110, effectively changing (e.g., decreasing) the inner diameter 408 of the chip collection tube 110. Thus, the inner diameter 408 of the chip collection tube 110 may be changed (e.g., adjusted) by rotating the first adjustment mechanism 406 relative to first frame assembly 402 of the chip collection tube 110.

In some embodiments, when the first plurality of adjustable walls 404 is rotated into the interior 436 of the first frame assembly 402, the inner diameter 408 of the chip collection tube 110 defined by the inner surfaces 446 of the first plurality of adjustable walls 404 may not be centered about (e.g., may be offset from) the central longitudinal axis 434 of the chip collection tube 110. In other embodiments, when the first plurality of adjustable walls 404 is rotated into the interior 436 of the first frame assembly 402, the inner diameter 408 of the chip collection tube 110 may be at least substantially centered about the central longitudinal axis 434 (e.g., centerline) of the chip collection tube 110.

Referring still to FIGS. 4A, 4B, and 4C together, the inner diameter 408 of a chip collection tube 110 may be adjusted to accommodate different sized chips 208. Thus, the chip collection tubes 110 of the present disclosure may provide an advantage by removing a need to have multiple different sized collection tubes on a single chip sorting device 100 in order to accommodate differing sized chips 208. Furthermore, the chip collection tubes 110 of the present disclosure may provide an advantage of negating a need to disassemble chip sorting devices and exchange collection tubes in order to accommodate different size chips 208. Moreover, the chip collection tubes 110 of the present disclosure may enable a chip sorting device 100 to be used for more than one chip size such that the chip sorting device 100 is not limited to a certain size of chip 208. The chip collection tubes 110 of the present disclosure may be used as universal collection tubes that can accommodate a range of chip sizes. Accordingly, a chip sorting device 100 utilizing the chip collection tubes 110 of the present disclosure may be used in a wider variety of applications (e.g., games) without require any components to be exchanged. Furthermore, chip sorting devices 100 utilizing the chip collection tubes 110 of the present disclosure may quickly be switched from sorting certain chip sizes to sorting different chip sizes as compared to conventional chip sorting devices currently available. Therefore, the chip collection tubes 110 increase the range of chips 208 and, as a result, the range of applications (e.g., games) that can be administered at a table to which a chip sorting device 100 is positioned under. Moreover, the chip collection tubes 110 of the present disclosure may reduce costs in producing and manufacturing chip sorting devices 100 for sorting mixtures of chips 208 having differing sizes because different chip collection tubes for different sizes of chips 208 will not have to be produced and manufactured. Rather, a plurality of the chip collection tubes 110 of the present disclosure can be used and each adjusted as needed to accommodate the different sizes of chips 208.

In some embodiments, the inner diameter 408 of the chip collection tube 110 may be manually adjusted by a user by rotating the first adjustment mechanism 406 relative the first frame assembly 402 and about the central longitudinal axis 434 of the chip collection tube 110. For example, the first adjustment mechanism 406 may have a plurality of positions that correlate to different chip 208 sizes, and a user can orient the first adjustment mechanism 406 in one of the plurality of positions depending on the size of the chips 208 (FIG. 2) to be sorted. In other embodiments, the inner diameter 408 of the chip collection tube 110 may be automatically adjusted by the chip sorting device 100 (FIG. 1). For example, the chip sorting device 100 (FIG. 1) may include a sensing element that senses a size of a chip 208 (FIG. 2) to be sorted, and based on the size, a control unit of the chip sorting device 100 (FIG. 1) may actuate the first adjustment mechanism 406 of the chip collection tube 110 to adjust the inner diameter 408 of the chip collection tube 110 to match the size of the chip 208 (FIG. 2) to be sorted. In yet other embodiments, the inner diameter 408 of the chip collection tube 110 may not have to be adjusted by a user or a control unit. Rather, in some embodiments, the inner diameter 408 may automatically adjust to an appropriate size when a chip 208 (FIG. 2) is inserted into the chip collection tube 110 by a chip ejection unit 108. For example, the first plurality of adjustable walls 404 may be positioned at (e.g., biased toward) a minimum inner diameter 408 of the chip collection tube 110, and when a chip 208 (FIG. 2) is inserted in the chip collection tube 110 by a chip ejection unit 108, if the chip 208 (FIG. 2) has a larger diameter than the minimum inner diameter 408 of the chip collection tube 110, the chip 208 (FIG. 2) will press against the at least one inner surfaces 446 of the first plurality of adjustable walls 404 and expand the inner diameter 408 of the chip collection tube 110 until the chip 208 (FIG. 2) fits within the chip collection tube 110. In other words, the chip 208 (FIG. 2) will press against the at least one inner surface 446 of the first plurality of adjustable walls 404 and will cause the first plurality of adjustable walls 404 to rotate about the pivot sides 442 of the first plurality of adjustable walls 404, and the inner diameter 408 of the chip collection tube 110 may be increased. Thus, in some embodiments, any need to manually adjust the inner diameters 408 of the chip collection tubes 110 may be at least substantially eliminated.

It is understood that while a chip sorting device 100 (FIG. 1) may have a plurality of chip collection tubes 110, the inner diameters 408 of the chip collection tubes 110 may vary in size one to another. Furthermore, in some embodiments, the plurality of chip collection tubes 110 of the chip sorting device 100 (FIG. 1) may all have the same inner diameter 408.

Figure 5A:
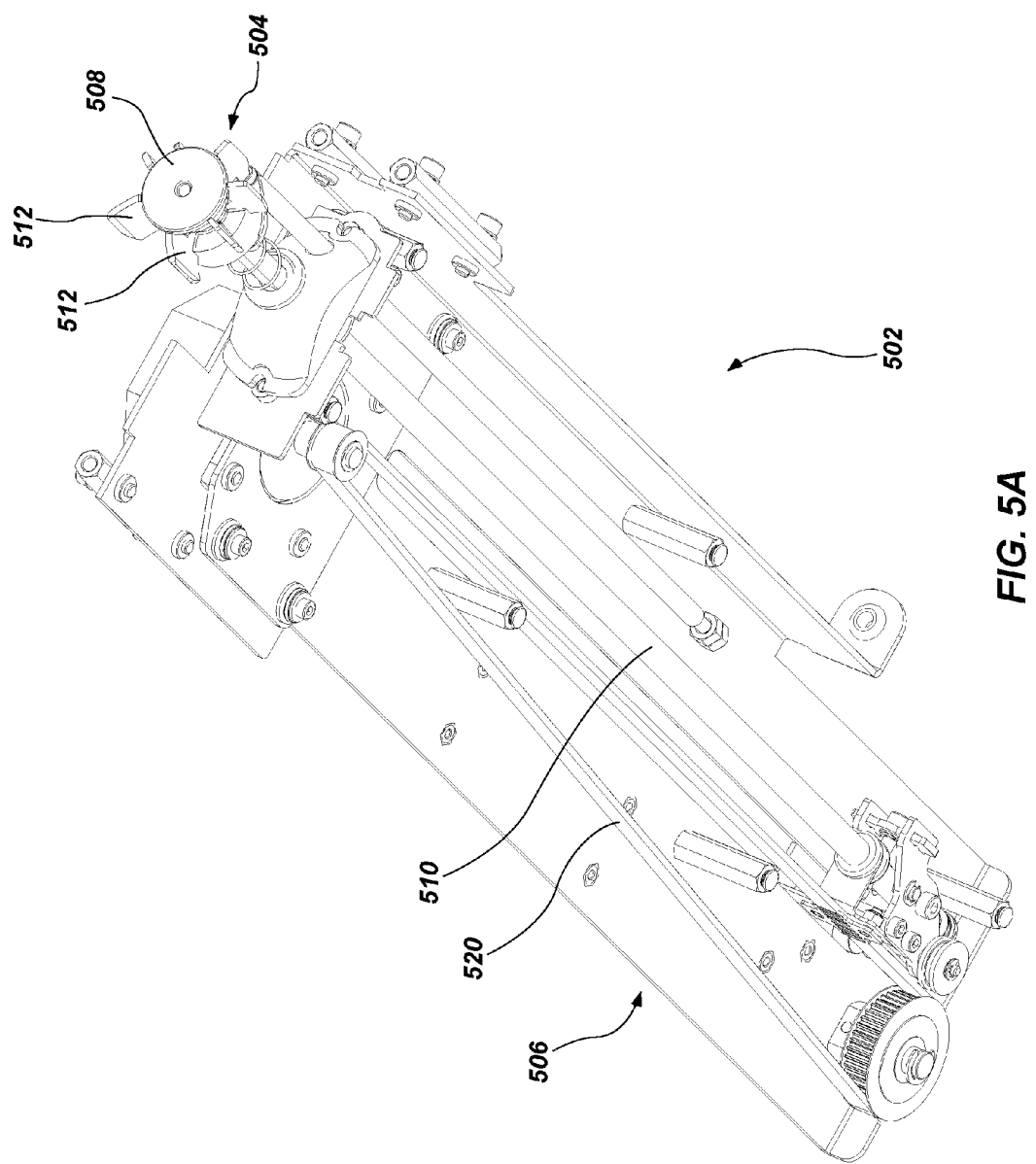
FIG. 5A shows a perspective view of a plunger assembly of the chip sorting device of FIG. 1 having portions removed to show the plunger and actuation assembly of the plunger assembly.

FIG. 5A is a perspective view of a plunger assembly 502 of the chip sorting device 100 (FIG. 1). The plunger assembly 502 may include a plunger 504 and an actuating assembly 506. The plunger 504 may be operably coupled to the actuating assembly 506. The plunger 504 may include a head portion 508 and an elongated portion 510. The head portion 508 may be connected to a longitudinal end of the elongated portion 510. The head portion 508 of the plunger 504 may include a plurality of arms 512 extending radially away from the head portion 508.

Referring to FIGS. 5A and 4A together, the plunger assembly 502 may be mounted to a bottom surface 448 of the lower plate 414 of the first frame assembly 402 of the chip collection tube 110, and the actuating assembly 506 may cause the plunger 504 of the plunger assembly 502 to pass back and forth through a longitudinal length of the chip collection tube 110. In some embodiments, the plunger 504 of the plunger assembly 502 may pass through the interior 436 of the first frame assembly 402 of the chip collection tube 110 and push any chips 208 (FIG. 2) that might be collected in the chip collection tube 110 up to a table surface of a table to which the chip sorting device 100 (FIG. 1) may be positioned under. In some embodiments, the actuating assembly 506 may be pneumatically actuated to cause the plunger 504 to pass through the interior 436 of the first frame assembly 402 of the chip collection tube 110. In other embodiments, the actuating assembly 506 may be electronically actuated to cause the plunger 504 to pass through the interior 436 of the first frame assembly 402 of the chip collection tube 110. For example, in some embodiments the actuating assembly 506 may include a solenoid assembly that causes the plunger 504 to pass through the interior 436 of the first frame assembly 402 of the chip collection tube 110. In some embodiments, the actuating assembly 506 may include a drive belt 520 to which the plunger 504 is operably coupled and by which the actuating assembly 506 may pass the plunger 504 through the interior 436 of the first frame assembly 402 of the chip collection tube 110. In some embodiments, the drive belt 520 may be at least partially formed from a nonmetal material (e.g., not a metal chain drive belt). For example, the drive belt 520 may be formed from a flexible polymer material that, as noted above with respect to drive belt 216, may be fiber-reinforced and that may require little to no maintenance (e.g., may not require regularly scheduled lubrication).

Figure 5B:
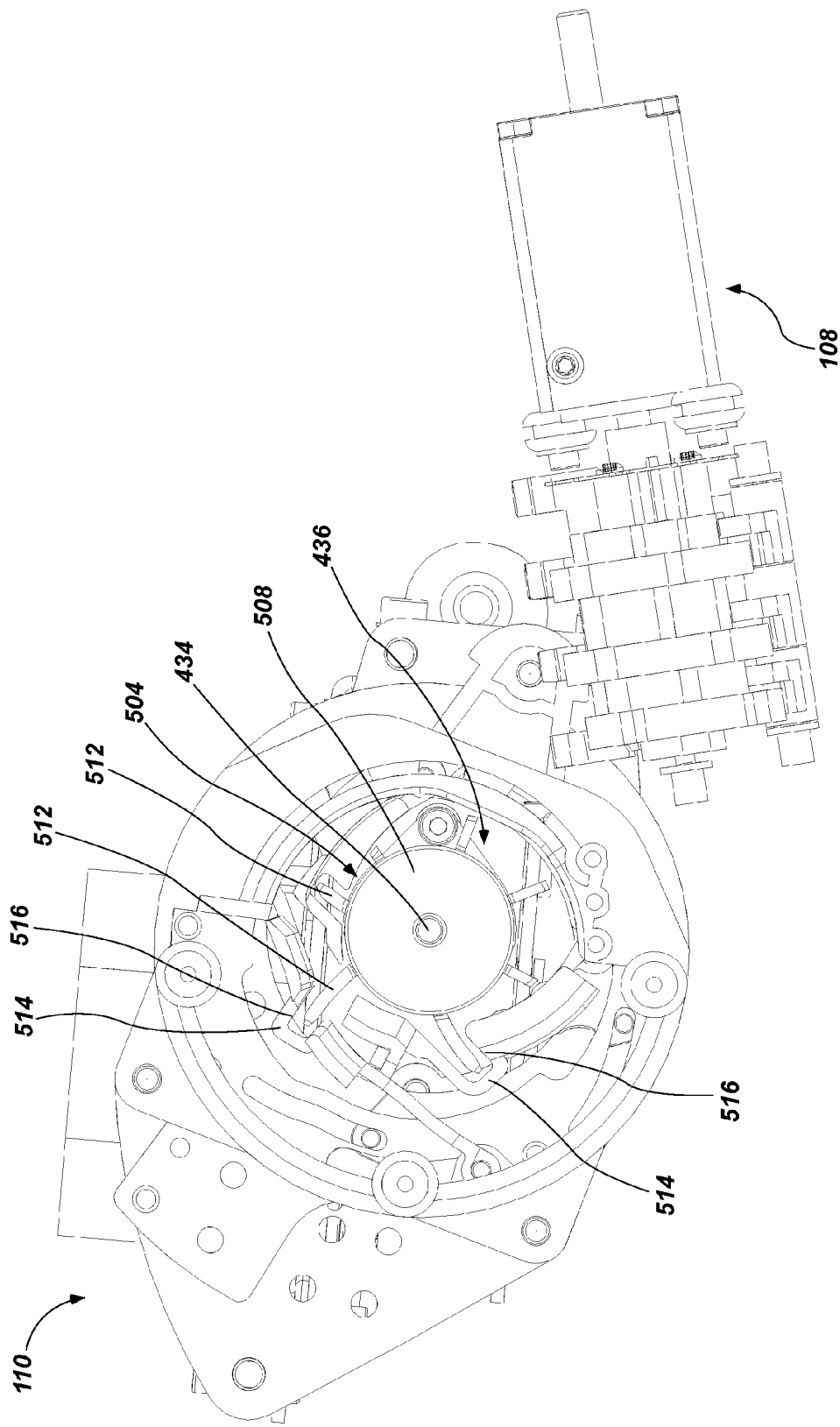
FIG. 5B shows a top elevation of the chip collection tube of FIG. 4A having portions removed to show a head portion of the plunger within the chip collection tube.

FIG. 5B is a top side view of a chip collection tube 110 having the plunger 504 of FIG. 5A disposed therein. Referring to FIGS. 5B and 4A together, in some embodiments, the arms 512 of the plunger 504 and the first plurality of adjustable walls 404 enable the plunger 504 to pass through the interior 436 of the first frame assembly 402 of the chip collection tube 110 and push any chips 208 (FIG. 2) that might be collected in the chip collection tube 110 up to a table surface throughout a range of inner diameters 408 (FIG. 4B) of the chip collection tube 110. In other words, the arms 512 of the plunger 504 and the first plurality of adjustable walls 404 enable the plunger 504 to pass through the interior 436 of the chip collection tube 110 even when the first plurality of adjustable walls 404 are presently rotated into the interior 436 of the chip collection tube 110 and the inner diameter 408 of the chip collection tube 110 is presently decreased. Stated in yet another way, the arms 512 of the plunger 504 and the first plurality of adjustable walls 404 enable the plunger 504 to pass through the interior 436 of the chip collection tube 110 regardless of the inner diameter 408 of the chip collection tube 110. For example, each adjustable wall 404 of the first plurality of adjustable walls 404 of a chip collection tube 110 may include an indented portion 514, which may correlate to a respective arm 512 of the plurality of arms 512 of the head portion 508 of the plunger 504 and that may be shaped to accommodate a respective arm 512 of the head portion 508 of the plunger 504. In other words, the indented portion 514 of each adjustable wall 404 may define a passage 516 through which a respective arm 512 of the plurality of arms 512 may pass through even when the respective arm 512 of the plurality of arms 512 extends out a distance from the central longitudinal axis 434 that is farther than a distance from the central longitudinal axis 434 to an inner surface 446 of the adjustable wall 404 (e.g., the respective arm 512 extends past the inner diameter 408). Thus, the plunger 504 may be used to push chips 208 (FIG. 2) collected in the chip collection tube 110 up to a table surface even when the inner diameter 408 (FIG. 4B) of the chip collection tube 110 is changed. Furthermore, in such an embodiment, when the inner diameter 408 (FIG. 4B) of the chip collection tube 110 is changed, the plunger 504 does not require any adjustment.

Figure 5C:
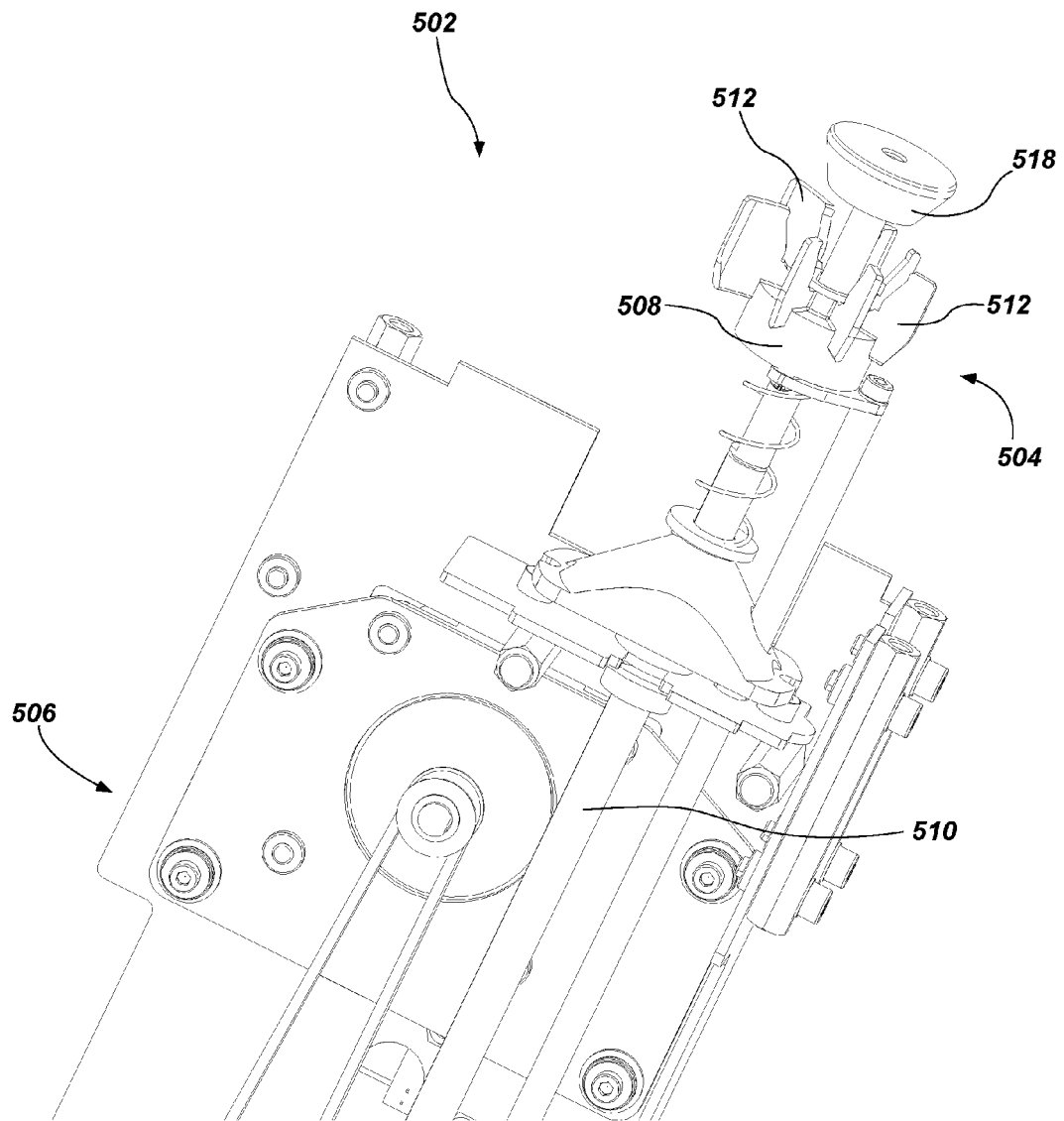
FIG. 5C shows a side view of the plunger assembly of FIG. 5A in an extended orientation.

FIG. 5C is a perspective view of a plunger assembly 502 of FIG. 5A in an extended position. As shown in FIG. 5C, in some embodiments, the head portion 508 of the plunger 504 of the plunger assembly 502 may further include an extension portion 518. The extension portion 518 may extend farther than the rest of the head portion 508 of the plunger 504 (e.g., plurality of arms 512). For example, when the plunger 504 is used to push chips 208 out of chip collection tube 110 (FIG. 4A) and up to a table surface, the plurality of arms 512 of the head portion 508 of the plunger 504 may stay below the table surface while the extension portion 518 may extend until at least a portion of the extension portion 518 is substantially flush with or above the table surface.

Figure 6A:
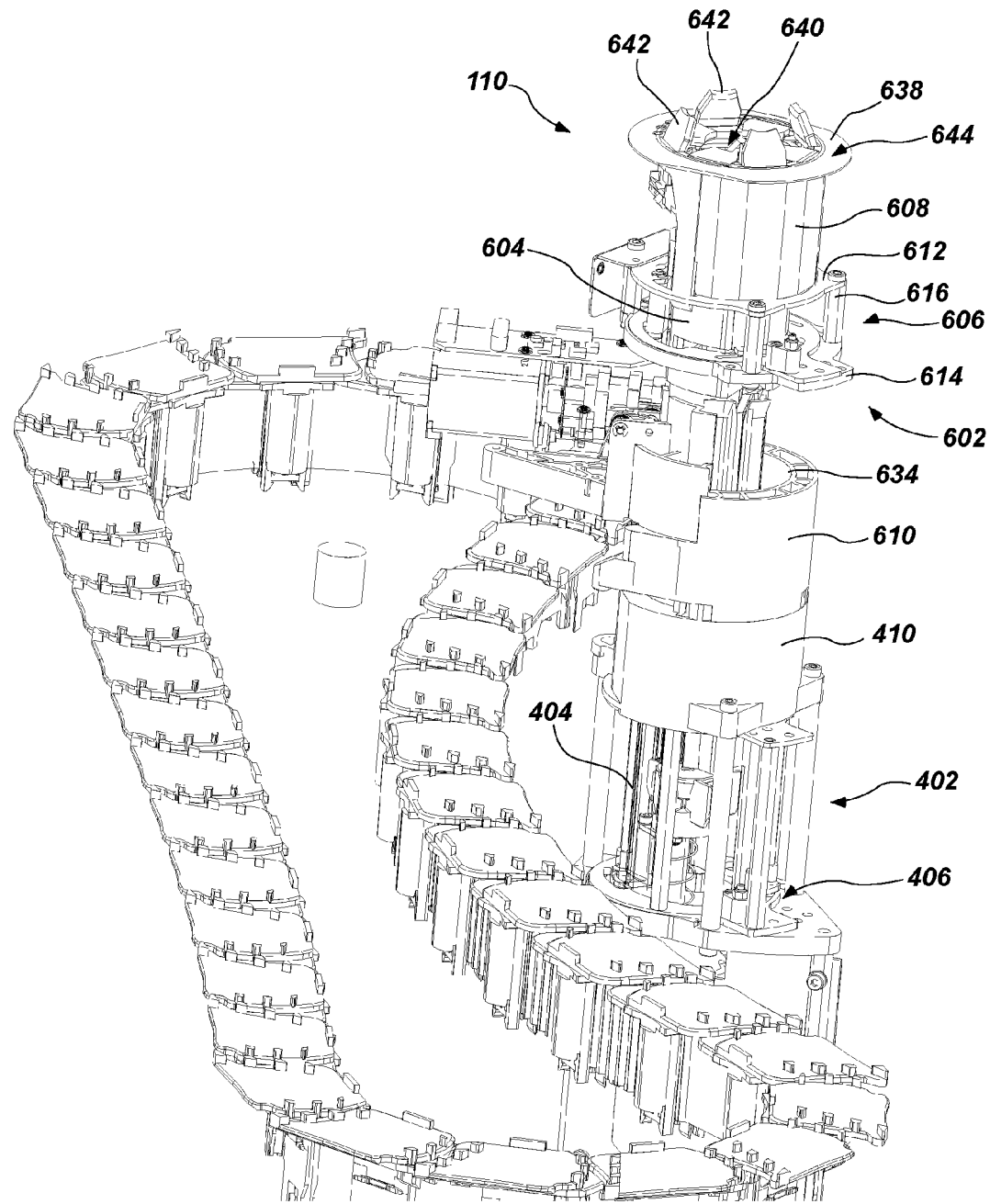
FIG. 6A shows a perspective view of the chip collection tube of FIG. 4A with additional portions shown.
Figure 6B:
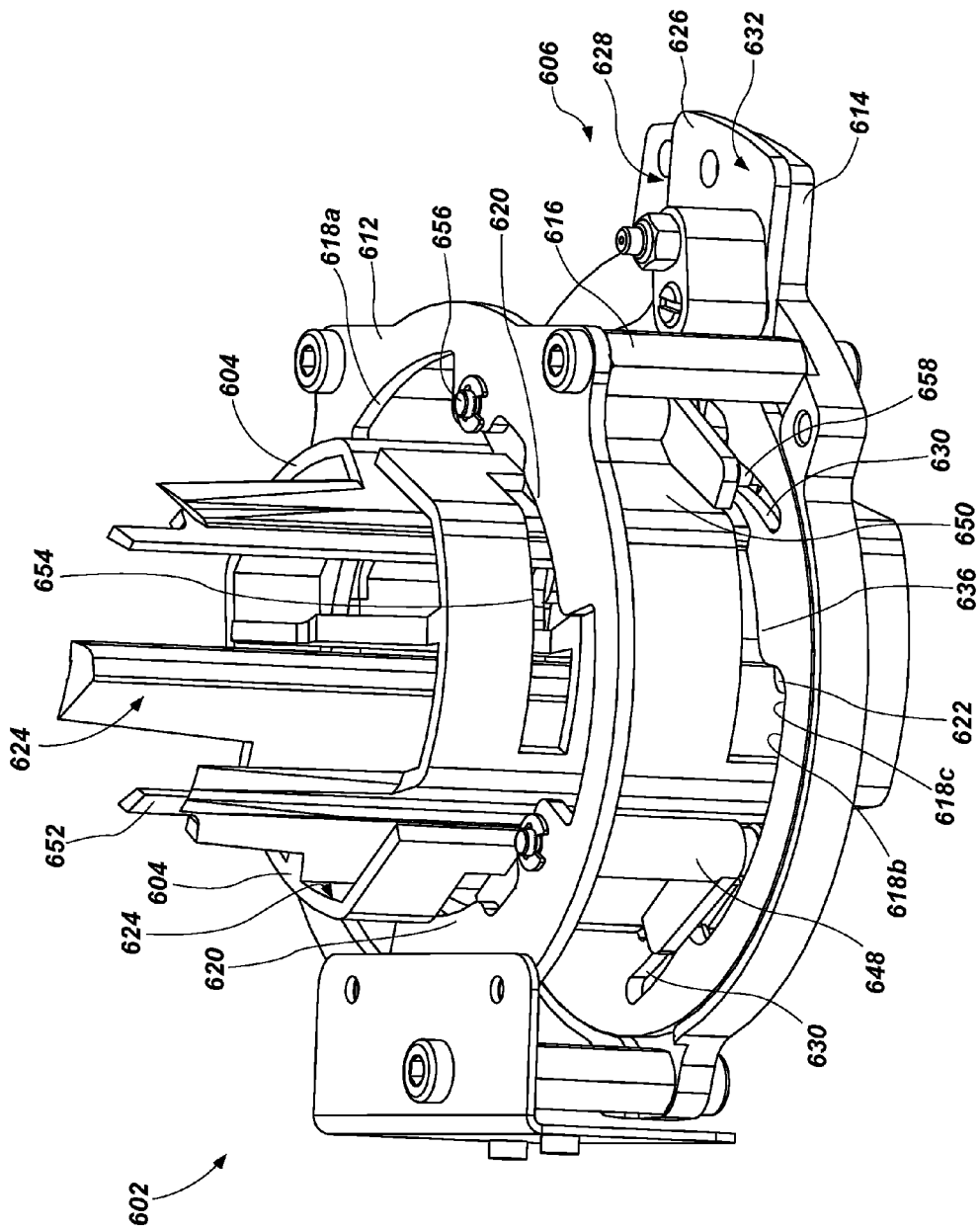
FIG. 6B shows a perspective view of a second frame assembly and a second plurality of adjustable walls of the chip collection tube.
Figure 6C:
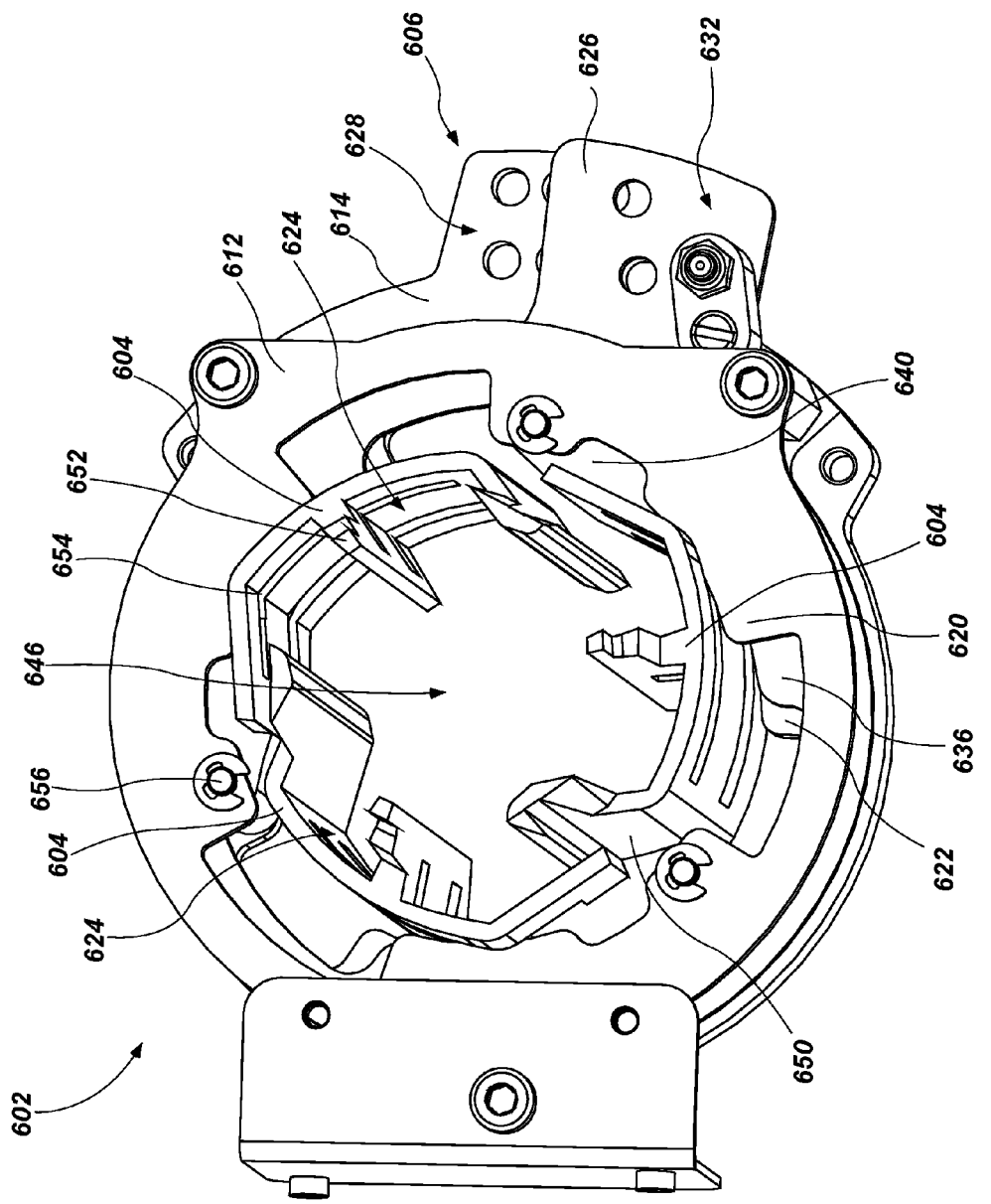
FIG. 6C shows a top elevation of the frame assembly and the second plurality of adjustable walls of FIG. 6B.

FIG. 6A is a perspective view of the chip collection tube 110 of FIG. 4A with additional portions of the chip sorting device 100 shown for clarity. As shown in FIG. 6A, the chip collection tube 110 may further include a second frame assembly 602, a second plurality of adjustable walls 604, a second adjustment mechanism 606, and a chip outlet portion 608. FIG. 6B is a perspective view of the second frame assembly 602, second plurality of adjustable walls 604, and second adjustment mechanism 606 with other portions removed to more clearly show the structure of the second frame assembly 602. FIG. 6C is a top side view of the second frame assembly 602, second plurality of adjustable walls 604, and second adjustment mechanism 606 of FIG. 6B. Referring to FIGS. 6A-6C together, the second frame assembly 602 of the chip collection tube 110 may be similar to the first frame assembly 402 of the chip collection tube 110 and may include a second tubular portion 610, an upper plate 612, a lower plate 614, and third plurality of support members 616. The second tubular portion 610 may be mounted to the upper longitudinal end of the first tubular portion 410 of the first frame assembly 402 of chip collection tube 110 and may define an aperture 634 extending therethrough, which may extend in an at least substantially vertical direction (e.g., along the central longitudinal axis 434 (FIG. 4A)). The lower plate 614 may be mounted above the second tubular portion 610 of the second frame assembly 602. The upper plate 612 may be disposed above the lower plate 614 with the third plurality of support members 616 connected to and extending between the upper plate 612 and lower plate 614. The upper plate 612 and lower plate 614 may each have a hole 618a, 618b, as shown in FIG. 6B, extending therethrough. Both of the holes 618a, 618b may be at least substantially aligned with the aperture 420 (FIG. 4A) extending through the first tubular portion 410 of the first frame assembly 402. In some embodiments, the upper plate 612 may include a first plurality of protrusions 620 that extend radially inward from an edge of the upper plate 612 defining the hole 618a extending through the upper plate 612. In some embodiments, the lower plate 614 may include a second plurality of protrusions 622 that extend radially inward from an edge of the lower plate 614 defining the hole 618b extending through the lower plate 614. The first and second plurality of protrusions 620, 622 may prevent chips 208 (FIG. 2) from falling off the head portion 508 (FIG. 5A) of the plunger 504 (FIG. 5A) and becoming stuck between the plunger 504 (FIG. 5A) and inner surfaces 624 of the second plurality of adjustable walls 604. For example, the first and second plurality of protrusions 620, 622 may prevent chips 208 (FIG. 2) from falling off the head portion 508 (FIG. 5A) of the plunger 504 (FIG. 5A) when the second plurality of adjustable walls 604 is not adjusted properly or when sorting an irregular sized chip.

The second adjustment mechanism 606 may be disposed between the upper plate 612 and lower plate 614 of the second frame assembly 602. The second adjustment mechanism 606 may include a lower plate portion 626. The lower plate portion 626 of the second adjustment mechanism 606 may be disposed adjacent to an upper surface 628 of the lower plate 614 of the second frame assembly 602. In some embodiments, the lower plate portion 626 may include a second plurality of guide recesses 630 defined in an upper surface 632 thereof. Each guide recess 630 of the second plurality of guide recesses 630 may define a respective pathway in the upper surface 632 of the lower plate portion 626 of the second adjustment mechanism 606. The lower plate portion 626 may further include a hole 618c extending therethrough. The hole 618c may be at least substantially aligned with the holes 618a, 618b extending through the upper and lower plates 612, 614 of the second frame assembly 602 and the aperture 634 extending through the second tubular portion 610 of the second frame assembly 602. The lower plate portion 626 of the second adjustment mechanism 606 may include a third plurality of protrusions 636 that extend radially inward from an edge of the lower plate portion 626 defining the hole 618c extending through the lower plate portion 626. Similar to the first and second plurality of protrusions 620, 622, the third plurality of protrusions 636 may assist in preventing chips 208 (FIG. 2) from falling off the head portion 508 (FIG. 5A) of the plunger 504 (FIG. 5A) and becoming stuck between the plunger 504 (FIG. 5A) and the inner surfaces 624 of the second plurality of adjustable walls 604. The second adjustment mechanism 606 may be rotatable relative to the second frame assembly 602 of the chip collection tube 110 and about the central longitudinal axis 434 (FIG. 4A) of the chip collection tube 110.

Referring to FIG. 6A, the chip outlet portion 608 of the chip collection tube 110 may include an upper rim 638, a chip outlet hole 640, and a flange 642. The chip outlet portion 608 may be oriented above the second frame assembly 602 of the chip collection tube 110 and may be positioned proximate a table surface of a table to which the chip sorting device 100 (FIG. 1) may be positioned beneath. The upper rim 638 may define the chip outlet hole 640 and may include an upper surface 644 configured to be at least substantially flush with the table surface of the table. The flange 642 may extend at least partially across the chip outlet hole 640 and may open and allow chips 208 (FIG. 2) to pass through the chip outlet hole 640 when the plunger 504 (FIG. 5A) of the plunger assembly 502 (FIG. 5A) pushes the chips 208 (FIG. 2) up to the table surface.

Referring again to FIGS. 6A-6C together, the second plurality of adjustable walls 604 may be disposed within an interior 646 of the second frame assembly 602 and may extend from the second tubular portion 610 and through the holes 618a, 618b in the upper and lower plates 612, 614 of the second frame assembly 602. In some embodiments, at least some of the second plurality of adjustable walls 604 may extend past the upper plate 612 of the second frame assembly 602. In other words, portions of the second plurality of adjustable walls 604 may extend above the upper plate 612 of the second frame assembly 602.

Each adjustable wall 604 of the second plurality of adjustable walls 604 may include a pivot side 648 and a swing side 650. The at least one inner surface 624 of each adjustable wall 604 may face the interior 646 of the second frame assembly 602 of the chip collection tube 110 and may at least partially define the inner diameter 408 (FIG. 4B) of the chip collection tube 110. In some embodiments, each adjustable wall 604 of the second plurality of adjustable walls 604 may include at least one projection 652 extending at least generally radially inward from the at least one inner surface 624 of each adjustable wall 604. The at least one projection 652 of each adjustable wall 604 of the second plurality of adjustable walls 604 may further assist in keeping chips 208 (FIG. 2) from falling off the head portion 508 (FIG. 5A) of the plunger 504 (FIG. 5A) and becoming stuck between the plunger 504 (FIG. 5A) and the inner surfaces 624 of the second plurality of adjustable walls 604. Furthermore, in some embodiments, each adjustable wall 604 of the second plurality of adjustable walls 604 may include at least one slot aperture 654 defined therein. The at least one slot aperture 654 of each adjustable wall 604 of the second plurality of adjustable walls 604 may receive the first and second plurality of protrusions 620, 622 of the upper plate 612 and lower plate 614 of the second frame assembly 602 and the third plurality of protrusions 636 of the lower plate portion 626 of the second adjustment mechanism 606. The at least one slot aperture 654 may permit the first, second, and third protrusions 620, 622, 636 to continue to prevent chips 208 (FIG. 2) from becoming stuck between the plunger 504 (FIG. 5A) and inner surfaces 624 of the second plurality of adjustable walls 604 even when the second plurality of adjustable walls 604 is adjusted to define larger inner diameters 408 (FIG. 4B).

The pivot side 648 of each adjustable wall 604 of the second plurality of adjustable walls 604 may be rotatably mounted to the lower plate 614 of the second frame assembly 602, and each adjustable wall 604 may be rotatable about an axis that is at least substantially parallel to the central longitudinal axis 434 (FIG. 4A) of the chip collection tube 110. For example, the second frame assembly 602 may include a second plurality of rod members 656 extending from the lower plate 614 to the upper plate 612 thereof, and the pivot side 648 of each adjustable wall 604 of the second plurality of adjustable walls 604 may be rotatably coupled to a respective rod member 656 of the second plurality of rod members 656, and each adjustable wall 604 of the second plurality of adjustable walls 604 may be rotatable about a respective rod member 656. Consequently, a swing side 650 of each adjustable wall 604 may be rotatable into the interior 646 of the second frame assembly 602. Accordingly, the at least one inner surface 624 of each adjustable wall 604 may be movable at least generally radially toward the central longitudinal axis 434 (FIG. 4A) of the chip collection tube 110, effectively changing the inner diameter 408 (FIG. 4B) of the chip collection tube 110.

Referring to FIG. 6B, each adjustable wall 604 of the second plurality of adjustable walls 604 may include a pin member 658 extending from a longitudinal end of each adjustable wall 604 of the second plurality of adjustable walls 604. The pin member 658 may extend into a respective guide recess 630 of the second plurality of guide recesses 630 defined in upper surface 632 of the lower plate portion 626 of the second adjustment mechanism 606 and may be movable along the pathway of the respective guide recess 630. The pathway of each guide recess 630 may be shaped and configured to cause a respective adjustable wall 604 to rotate about the pivot side 648 of the respective adjustable wall 604 as the pin member 658 is caused to move along the pathway.

Referring to FIGS. 6A, 6B, and 6C together, in operation, when changing the inner diameter 408 (FIG. 4B) of the chip collection tube 110, the second plurality of adjustable walls 604 may be rotated into or out of the interior 646 of second frame assembly 602 of the chip collection tube 110 by rotating the second adjustment mechanism 606 relative to the second frame assembly 602 and about the central longitudinal axis 434 (FIG. 4A) of the chip collection tube 110. As the second adjustment mechanism 606 is rotated relative to the second frame assembly 602 each pin member 658 of each adjustable wall 604 of the second plurality of adjustable walls 604 may be caused to move along a respective pathway of a respective guide recess 630 of the second plurality of guide recesses 630. As each pin member 658 is caused to move along a respective pathway, a respective adjustable wall 604 of the second plurality of adjustable walls 604 may be caused to rotate about the pivot side 648 of the adjustable wall 604. As a result, the swing side 650 of the adjustable wall 604 may be rotated into the interior 646 of the second frame assembly 602 of the chip collection tube 110 and toward the central longitudinal axis 434 (FIG. 4A) of the chip collection tube 110. Furthermore, as a result, the at least one inner surface 624 and the at least one projection 652 of the adjustable wall 604 may be moved toward the central longitudinal axis 434 of the chip collection tube 110, effectively changing (e.g., decreasing) the inner diameter 408 (FIG. 4B) of the chip collection tube 110. Thus, the inner diameter 408 (FIG. 4B) of the chip collection tube 110 may be changed (e.g., adjusted) by rotating the second adjustment mechanism 606 relative to second frame assembly 602 of the chip collection tube 110. In some embodiments, when the second plurality of adjustable walls 604 is rotated into the interior 646 of the second frame assembly 602, the inner diameter 408 (FIG. 4B) of the chip collection tube 110 defined by the inner surfaces 624 of the second plurality of adjustable walls 604 may be at least substantially centered about the central longitudinal axis 434 (FIG. 4A) of the chip collection tube 110. In other embodiments, when the second plurality of adjustable walls 604 is rotated into the interior 646 of the second frame assembly 602, the inner diameter 408 (FIG. 4B) of the chip collection tube 110 defined by the inner surfaces 624 of the second plurality of adjustable walls 604 may not be centered about the central longitudinal axis 434 (FIG. 4A) of the chip collection tube 110.

In some embodiments, the first plurality of adjustable walls 404 and the second plurality of adjustable walls 604 may rotate in unison. In other words, the first plurality of adjustable walls 404 and the second plurality of adjustable walls 604 may define at least substantially the same inner diameter 408 (FIG. 4B) of the chip collection tube 110 at the same time. For example, the first adjustment mechanism 406 and the second adjustment mechanism 606 may be coupled such that rotating one of the first adjustment mechanism 406 or the second adjustment mechanism 606, rotates the other.

In some embodiments, the chip collection tube 110 may have only a first plurality of adjustable walls 404 and may not include a second plurality of adjustable walls 604. In such embodiments, the first plurality of adjustable walls 404 may extend from the lower plate 414 of the first frame assembly 402 to the chip outlet portion 608 of the chip collection tube 110. Furthermore, in such embodiments, the chip collection tube 110 may include only a first adjustment mechanism 406.

Figure 7A:
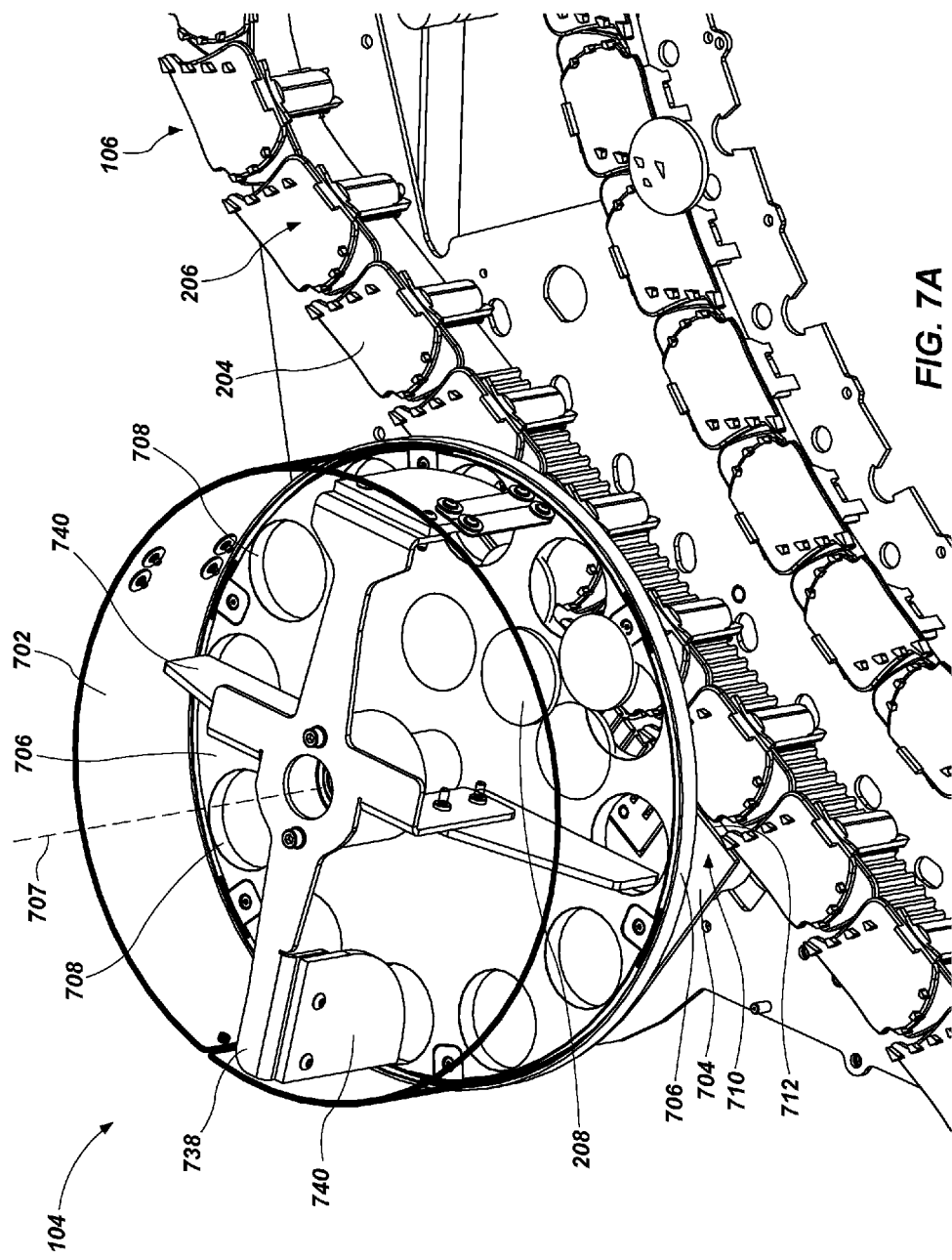
FIG. 7A shows a perspective view of a chip hopper of the chip sorting device of FIG. 1.

FIG. 7A is a perspective view of the chip hopper 104 of a chip sorting device 100 (e.g., the chip sorting device 100 shown in FIGS. 1 and 2). The chip hopper 104 may include a chip chamber 702 and a base plate 704. The chip chamber 702 may include a separating wheel base 706 having a plurality of circular holes 708 defined therein. Each of the plurality of circular holes 708 defined in the separating wheel base 706 may receive at least one chip 208. The chip chamber 702 may be mounted for rotation about a central axis 707 over an upper surface 710 of the base plate 704, and the chip chamber 702 may be rotatable relative to the base plate 704. The base plate 704 may include a linear side 712 and may be oriented with the linear side 712 of the base plate 704 being immediately adjacent and extending along a portion of the chip conveyor unit 106 of the chip sorting device 100 (FIG. 1). A portion of the chip chamber 702 may extend past the linear side 712 of the base plate 704 and over the chip conveyor unit 106 of the chip sorting device 100 (FIG. 1) in order to supply chips 208 from the chip chamber 702 onto the chip conveyor unit 106.

In operation, a plurality of chips 208 may be inserted into the chip chamber 702 of the chip hopper 104 and the chip chamber 702 may rotate relative to the base plate 704. For example, the chip sorting device 100 (FIG. 1) may be positioned beneath a table, with the chip chamber 702 of the chip hopper 104 exposed (e.g., oriented adjacent to an edge of the table or positioned in an opening in the table). At certain intervals during game play, an operator (not shown) may move a plurality of chips 208 from a surface of the table to the chip chamber 702 to be sorted by the chip sorting device 100 (FIG. 1). In some embodiments, the chip sorting device 100 may be separate from the table, such as in a counting room of a casino (not shown).

The chips 208 may come to rest at a bottom of the chip chamber 702 and may be urged (e.g., by gravity and/or by a chip displacement device 738) to fall into individual circular holes 708 of the plurality of circular holes 708 of the separating wheel base 706. For example, the chip displacement device 738 may rotate relative to chip chamber 702 and separating wheel base 706 and may include displacement members 740 to move chips 208 (e.g., displace, stir, etc.) within the chip chamber 702 and urge the chips 208 into the plurality of circular holes 708 of the separating wheel base 706.

As the chips 208 are urged into the plurality of circular holes 708, the chip chamber 702 may be rotated and the separating wheel base 706 may slide the chips 208 within the plurality of circular holes 708 along a circumferential path on the upper surface 710 of the base plate 704 until the chips 208 are moved past the linear side 712 of the base plate 704 and over the chip conveyor unit 106. The chips 208 may then be delivered into a chip well 206 of an articulated link unit 204 of the chip conveyor unit 106. For example, the chips 208 may fall through the plurality of circular holes 708 and into a chip well 206 of an articulated link unit 204 of the chip conveyor unit 106. The chips 208 may then be delivered by the chip conveyor unit 106 to the plurality of chip ejection units 108 (FIG. 1) and plurality of chip collection tubes 110 (FIG. 1).

Figure 7B:
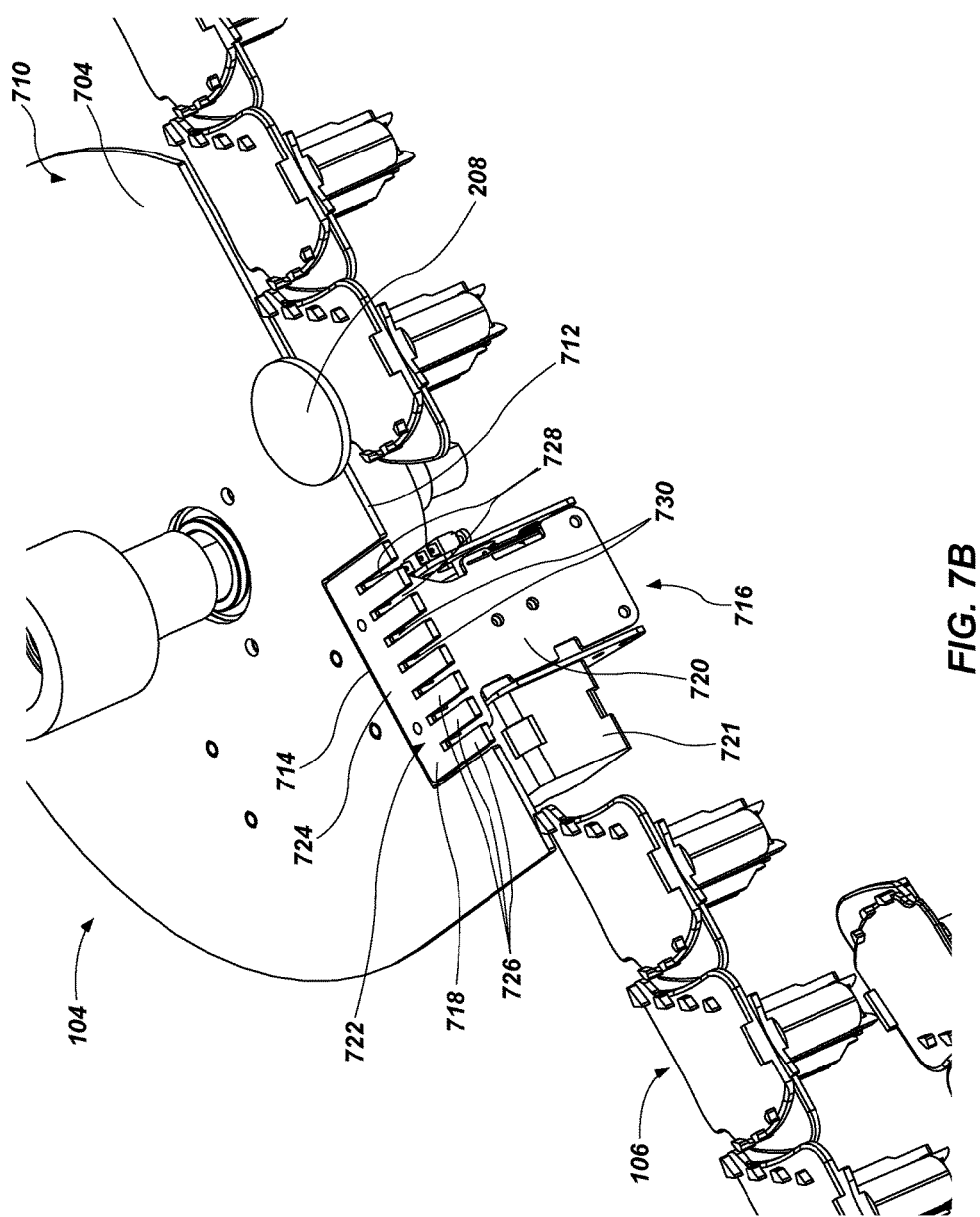
FIG. 7B shows a perspective view of a base plate of the chip hopper of FIG. 7A with portions removed to show a relief mechanism of the chip hopper.

FIG. 7B is a perspective view of the chip hopper 104 of FIG. 7A with the chip chamber 702 removed to more clearly show the structure of the base plate 704. As shown in FIG. 6B, the base plate 704 may include a cutout 714 extending through base plate 704, and the chip hopper 104 may further include a relief mechanism 716 disposed in the cutout 714. The cutout 714 may extend from the linear side 712 of the base plate 704 into the base plate 704, and the relief mechanism 716 disposed in the cutout 714 may be oriented immediately adjacent to the chip conveyor unit 106 (e.g., such that a linear side of the relief mechanism 716 may be coextensive with the linear side 712 of the relief mechanism 716). The cutout 714 may be oriented along the circumferential path along which the separating wheel base 706 transports chips 208.

The relief mechanism 716 may include a top plate 718, a pusher 720, and an actuator 721. The relief mechanism 716 may act to remove chips 208 that become jammed (e.g., stuck) between the chip chamber 702 and the upper surface 710 of the base plate 704 of the chip hopper 104. For example, chips 208 may become stuck between the chip chamber 702 and the upper surface 710 of the base plate 704 by slipping at least partially beneath the chip chamber 702 and/or becoming wedged between the separating wheel base 706 and the base plate 704. Chips 208 may be caused to slip beneath the chip chamber 702 for many reasons such as, for example, when the chips 208 are misshaped due to normal wear and tear or when the chips 208 are dirty due to use. Chips 208 that become stuck between the chip chamber 702 and base plate 704 of the chip hopper 104 may continue to move with the chip chamber 702 as the chip chamber 702 rotates relative to the base plate 704 of the chip hopper 104.

The relief mechanism 716 may be oriented in the cutout 714 of the base plate 704 such that a top surface 722 of the top plate 718 of the relief mechanism 716 is as least substantially flush with the upper surface 710 of the base plate 704. The top plate 718 of the relief mechanism 716 may have substantially a same shape as the cutout 714 of the base plate 704, and the top plate 718 may at least substantially fill the cutout 714 of the base plate 704. The top plate 718 may include a base region 724, a plurality of teeth 726, and a plurality of slot voids 728 defined between the teeth 726. The plurality of teeth 726 may extend from the base region 724, and each of the plurality of slot voids 728 may be defined between adjacent teeth 726 of the plurality of teeth 726. The relief mechanism 716 may be oriented in the cutout 714 of the base plate 704 such that the teeth 726 of the top plate 718 of the relief mechanism 716 extend toward the chip conveyor unit 106 and in a direction at least generally perpendicular to the straight pathway portion of the chip conveyor unit 106. For example, the top plate 718 may have a comb-like structure.

The pusher 720 may be oriented generally beneath the top plate 718 and may include a plurality of fingers 730 that extends into the plurality of slot voids 728 between adjacent teeth 726 of the plurality of teeth 726 of the top plate 718 of the relief mechanism 716. The plurality of fingers 730 may slide along the longitudinal length of the slot voids 728 and grasp any chips 208 that may be present on the top surface 722 of the top plate 718 of the relief mechanism 716.

Referring to FIGS. 7A and 7B together, the relief mechanism 716 may be able to increase a space between the chip chamber 702 and the top surface 722 of the top plate 718 of the relief mechanism 716. For example, at least a portion of the top plate 718 may be lowered relative to the base plate 704 of the chip hopper 104 (e.g., at least a portion of the relief mechanism 716 may move away from the separating wheel base 706). In some embodiments, the entire top plate 718 of the relief mechanism 716 may be lowered relative to the base plate 704 of the chip hopper 104. In other embodiments, only a portion of the top plate 718 may be lowered relative to the base plate 704 of the chip hopper 104. For example, the top plate 718 of the relief mechanism 716 may be rotated (e.g., swiveled, swung, pivoted) downward about the base region 724 of the top plate 718 of the relief mechanism 716 relative to the base plate 704 of the chip hopper 104 such that the teeth 726 of the top plate 718 are rotated downward and away from the chip chamber 702 of the chip hopper 104 (e.g., rotated away from the separating wheel base 706).

In some embodiments, the top plate 718 of the relief mechanism 716 may be biased toward a position wherein the top surface 722 of the top plate 718 is at least substantially flush with the upper surface 710 of the base plate 704 of the chip hopper 104 (i.e., a non-lowered position). In such embodiments, any chips 208 that become stuck between the chip chamber 702 and the upper surface 710 of the base plate 704 of the chip hopper 104 may cause (e.g., force) the top plate 718 of the relief mechanism 716 to lower relative to the base plate 704 of the chip hopper 104. In other embodiments, the top plate 718 of the relief mechanism 716 may be lowered by the actuator 721 and the relief mechanism 716 may further include a sensor to sense when a chip 208 is stuck between the chip chamber 702 and the upper surface 710 of the base plate 704 of the chip hopper 104. In such embodiments, the actuator 721 may lower the top plate 718 of the relief mechanism 716 when the sensor senses a stuck chip 208. In yet other embodiments, the top plate 718 of the relief mechanism 716 may be biased toward a non-lowered position and may be lowered (e.g., forced downward away from the chip hopper 104) by a stuck chip 208 but may be further lowered by the actuator 721. For example, when the top plate 718 is pushed down by a stuck chip 208, the actuator 721 may cause the top plate 718 to further lower relative to the base plate 704 of the chip hopper 104. Regardless of how the top plate 718 is lowered, when a chip 208 that is stuck between the chip chamber 702 and the base plate 704 is moved over the top plate 718 of the relief mechanism 716 and the top plate 718 is lowered, the chip 208 may be moved into a chip well 206 of the chip conveyor unit 106 to avoid any further jamming of the chip chamber 702 (e.g., halting rotation of the chip chamber 702).

Furthermore, when the top plate 718 of the relief mechanism 716 is lowered, the plurality of fingers 730 of the pusher 720 may extend through the slot voids 728 of the top plate 718 and above the top surface 722 of the top plate 718 of the relief mechanism 716 in order to grasp chips 208 that may be present on the top surface 722 of the top plate 718 of the relief mechanism 716. Furthermore, when the top plate 718 of the relief mechanism 716 is lowered, the actuator 721 may move the plurality of fingers 730 of the pusher 720 along the slot voids 728 between the teeth 726 of the top plate 718 to push chips 208 across the top surface 722 of the top plate 718 and into a chip well 206 of an articulated link unit 204 of the chip conveyor unit 106. For example, the actuator 721 may move the plurality of fingers 730 of the pusher 720 through sweeping motions that include raising the plurality of fingers 730 of the pusher 720 above the top surface 722 of the top plate 718 near the base region 724 of the top plate 718, sliding the plurality of fingers 730 along the longitudinal lengths of the slot voids 728 while the plurality of fingers 730 are raised above the top surface 722 of the top plate 718, and dropping the plurality of fingers 730 beneath the top surface 722 of the top plate 718 once the plurality of fingers 730 reaches the chip conveyor unit 106, and bringing the plurality of fingers 730 back to the base region 724 of the top plate 718 while the plurality of fingers 730 is beneath the top surface 722 of the top plate 718 of the relief mechanism 716.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method of sorting chips, comprising:
    inserting at least one chip into a chip chamber of a chip hopper rotatably mounted over a base plate of the chip hopper, the base plate including a relief mechanism having a top plate in substantial alignment with an upper surface of the base plate;
    receiving the at least one chip into a hole of a plurality of circular holes defined in a separating wheel base of the chip chamber;
    transporting the at least one chip along a circumferential path from the upper surface of the base plate of the chip hopper onto the top plate of the relief mechanism; and
    increasing space between the chip chamber and the top plate of the relief mechanism by moving the top plate of the relief mechanism away from the chip chamber while maintaining a spacing between the chip chamber and the upper surface of the base plate.

2. The method of claim 1, further comprising pushing the at least one chip along the top plate of the relief mechanism with a pusher having at least one finger extending through an opening in the relief mechanism into a chip well of a chip conveyor unit.

3. The method of claim 2, wherein pushing the at least one chip comprises:
    driving the at least one finger comprising a plurality of fingers along the opening in the relief mechanism comprising a plurality of slot voids; and
    extending each finger of the plurality of fingers through a respective slot void of the plurality of slot voids of the relief mechanism.

4. The method of claim 3, further comprising:
    extending the plurality of fingers above a surface of the top plate of the relief mechanism; and
    pushing a chip across the surface of the top plate of the relief mechanism and into the at least one chip well of the chip conveyor unit.

5. The method of claim 1, further comprising pushing a chip across a surface of the top plate of the relief mechanism and into at least one chip well of a chip conveyor unit with a pusher.

6. The method of claim 1, further comprising biasing the top plate of the relief mechanism toward a position wherein a surface of the top plate is oriented at least substantially flush with the upper surface of the base plate.

7. The method of claim 1, further comprising moving at least a portion of the top plate of the relief mechanism away from the chip chamber of the chip hopper in response to a chip that is at least partially stuck between the chip chamber and the base plate of the chip hopper as the chip passes over the top plate of the relief mechanism.

8. A method of transporting chips, comprising:
    moving a chip chamber of a chip hopper over a base plate;
    displacing a relief plate away from the chip chamber and the base plate, a top surface of the relief plate being initially oriented substantially flush with an upper surface of the base plate in a non-displaced position; and
    biasing the relief plate toward the non-displaced position wherein the top surface of the relief plate is oriented at least substantially flush with the upper surface of the base plate.

9. The method of claim 8, further comprising transporting at least one chip of the chips to at least one chip well of a chip conveyor unit.

10. The method of claim 9, further comprising pushing at least one stuck chip of the chips from the chip chamber that is at least partially stuck proximate the relief plate across a top surface of the top plate of the relief plate and into the at least one chip well of the chip conveyor unit with a pusher.

11. The method of claim 10, further comprising moving at least a portion of the relief plate away from the chip chamber of the chip hopper in response to the at least one stuck chip to define an opening between the relief plate and the chip hopper.

12. The method of claim 11, further comprising passing the at least one stuck chip through the opening into the at least one chip well of the chip conveyor unit.

13. The method of claim 8, wherein moving the chip chamber of the chip hopper over the base plate comprises rotating the chip chamber about a center axis relative to the base plate.

14. The method of claim 8, further comprising receiving the chips in a separating wheel base of the chip chamber having circular recesses configured to receive at least one chip of the chips.

15. A method of transporting chips, comprising:
moving a chip chamber of a chip hopper over a base plate;
displacing a relief plate away from the chip chamber, the relief plate being initially oriented substantially flush with an upper surface of the base plate in a non-displaced position; and
pushing at least one chip of the chips into at least one chip well of a chip conveyor unit with at least one at least one finger of a pusher extending through the relief plate.

16. A method of transporting chips, comprising:
rotating a chip chamber of a chip hopper, comprising:
moving the chip chamber over an upper surface of a base plate defining a first portion of a chip path in the chip hopper; and
moving the chip chamber from the upper surface of the base plate to an upper surface of a relief feature defining a second portion of the chip path in the chip hopper;
displacing the relief feature away from the chip chamber with at least one chip of the chips; and
transporting the at least one chip of the chips to at least one chip well of a chip conveyor unit.

17. The method of claim 16, wherein transporting the at least one chip of the chips to the at least one chip well comprises pushing the at least one chip of the chips into the at least one chip well of the chip conveyor unit with a pusher extending through the relief feature.

18. The method of claim 16, further comprising positioning the relief feature adjacent a lower surface of the chip chamber in a non-displaced position.

19. The method of claim 18, further comprising biasing the relief plate in the non-displaced position.

* * * * *